(12) United States Patent
Maloney

(10) Patent No.: US 11,454,188 B2
(45) Date of Patent: Sep. 27, 2022

(54) SYSTEMS AND METHODS FOR RESCALING EXECUTABLE SIMULATION MODELS

(71) Applicant: The MathWorks, Inc., Natick, MA (US)

(72) Inventor: Peter J. Maloney, Northville, MI (US)

(73) Assignee: The MathWorks, Inc., Natick, MA (US)

(*) Notice: Subject to any disclaimer, the term of this patent is extended or adjusted under 35 U.S.C. 154(b) by 527 days.

(21) Appl. No.: 15/612,765

(22) Filed: Jun. 2, 2017

(65) Prior Publication Data

US 2018/0347498 A1    Dec. 6, 2018

(51) Int. Cl.
*F02D 41/26* (2006.01)
*F02D 41/14* (2006.01)
(Continued)

(52) U.S. Cl.
CPC ......... *F02D 41/26* (2013.01); *F02D 41/1401* (2013.01); *F02D 41/2422* (2013.01);
(Continued)

(58) Field of Classification Search
CPC .. F02D 41/26; F02D 41/1401; F02D 41/1433; F02D 41/1423; F02D 41/2422;
(Continued)

(56) References Cited

U.S. PATENT DOCUMENTS 2,771,243 A * 11/1956 Wolin ...................... G06G 7/64
703/8
5,845,627 A    12/1998 Olin et al.
(Continued)

FOREIGN PATENT DOCUMENTS

CN    105201639 A    12/2015
CN    205003469 U    1/2016
(Continued)

OTHER PUBLICATIONS

Altera Corporation, Hardware in the Loop from the MATLAB/Simulink Environment, Sep. 2013, pp. 1-9. <https://www.intel.com/content/dam/www/programmable/us/en/pdfs/literature/wp/wp-01208-hardware-in-the-loop.pdf>. Accessed Jun. 10, 2019. (Year: 2013).*
(Continued)

*Primary Examiner* — Logan M Kraft
*Assistant Examiner* — Joshua Campbell
(74) *Attorney, Agent, or Firm* — Cesari and McKenna, LLP; Michael R. Reinemann

(57) ABSTRACT

Systems and methods automatically rescale an original engine model so that it models an engine of a different size. The original engine model may be coupled to an engine controller model, and the systems and methods may also rescale the original controller model to produce a rescaled controller model matched to the rescaled engine model. The original engine model may include engine parameters and engine lookup tables, and the original controller model may include controller parameters and controller lookup tables. Rescaling factors indicating the size of the new engine being modeled may be received, and ratios may be computed as a function of the rescaling factors. Original engine parameters and controller parameters may be rescaled based on the ratios. Original engine lookup tables and controller lookup tables may be reshaped based on the ratios.

36 Claims, 24 Drawing Sheets

(51) Int. Cl.
*F02D 41/24* (2006.01)
*B60W 50/00* (2006.01)
*B60C 99/00* (2006.01)

(52) U.S. Cl.
CPC .... *B60C 99/006* (2013.01); *B60W 2050/0028* (2013.01); *F02D 2041/1423* (2013.01); *F02D 2041/1433* (2013.01); *F02D 2200/101* (2013.01); *F02D 2200/1002* (2013.01); *G05B 2219/45024* (2013.01)

(58) Field of Classification Search
CPC ....... F02D 2200/101; F02D 2200/1002; G06F 17/5095; G05B 2219/45024; B60C 99/006; B60W 2050/0028
See application file for complete search history.

(56) References Cited

U.S. PATENT DOCUMENTS

| | | | |
|---|---|---|---|
| 6,196,188 B1* | 3/2001 | Janic | F02D 11/105 123/350 |
| 6,199,030 B1* | 3/2001 | Stone | A63F 13/10 703/8 |
| 6,304,835 B1* | 10/2001 | Hiramatsu | G06G 7/64 703/7 |
| 6,321,142 B1* | 11/2001 | Shutty | F02D 41/2422 701/1 |
| 7,930,153 B2 | 4/2011 | Eryilmaz et al. | |
| 8,532,961 B2* | 9/2013 | Guo | G06F 30/23 702/191 |
| 9,075,939 B2* | 7/2015 | Phatak | G06F 30/17 |
| 2010/0305912 A1* | 12/2010 | Viassolo | G05B 17/02 703/2 |
| 2015/0142405 A1* | 5/2015 | Malischewski | G06F 30/20 701/7 |
| 2015/0234953 A1* | 8/2015 | Speetzen | F02D 41/2406 703/2 |
| 2016/0084180 A1* | 3/2016 | Zhu | F02D 41/0072 701/103 |
| 2016/0138487 A1* | 5/2016 | Sitzler | F02D 13/0261 701/102 |

FOREIGN PATENT DOCUMENTS

| | | | |
|---|---|---|---|
| CN | 105308296 A | 2/2016 | |
| CN | 106200668 A | 12/2016 | |
| DE | 102006059829 A1 | 6/2008 | |
| EP | 0869417 B1 * | 3/2003 | ............ F01N 11/007 |

OTHER PUBLICATIONS

"Automotive Simulation Models," dSPACE GmbH, Jan. 2017, pp. 1-36.

Maloney, Peter J., "Objective Determination of Minimum Engine Mapping Requirements for Optimal SI DIVCP Engine Calibration," The MathWorks, Inc., SAE International, Apr. 20, 2009, pp. 1-29.

"Mean-Value Internal Combustion Engine Model: Simulink® S-Function Generation from MapleSim™" MapleSim™, Maplesoft, 2011, pp. 1-8.

Morel, Thomas, "Simulation Assists Vehicle and Powertrain Optimization and Component Selection," SAE 2011 Electronic Systems for Vehicle Propulsion Symposium, Nov. 8-9, 2011, Tory, MI, USA, pp. 1-47.

"Powertrain Blockset™ User's Guide: R2016b," The MathWorks, Inc., Oct. 2016, pp. 1-144.

"Powertrain Blockset™ User's Guide: R2017a," The MathWorks, Inc., Mar. 2017, pp. 1-184.

"Simulink® User's Guide: R2017a," The MathWorks, Inc., Mar. 2017, pp. 1-3856.

"English Translation of First Office Action," National Intellectual Property Administration, P. R. China, CN Patent Application No. 201810555203.5, dated Dec. 11, 2020, pp. 1-16.

"Field Oriented Control of Permanent Magnet Synchronous Motors: User's Guide," Microsemi, Jun. 2012, pp. 1-43.

Hu, Dakai, "Calibrating Optimal PMSM Torque Control with Field-Weakening Using Model-Based Calibration," The MathWorks, Inc., retrieved from the Internet: <https://www.mathworks.com/company/newsletters/articles/calibrating-optimal-pmsm-torque-control-with-field-weakening-using-model-based-calibration.html>, retrieved on: Feb. 11, 2022, published 2020, pp. 1-4.

Stipetic, Stjepan, et al., "Scaling Laws for Synchronous Permanent Magnet Machines," IEEE, 2015 Tenth International Conference on Ecological Vehicles and Renewable Energies (EVER), Monte Carlo, Monaco, Mar. 31-Apr. 2, 2015, pp. 1-7.

Stipetic, Stjepan, et al., "Ultra-fast Axial and Radial Scaling of Synchronous Permanent Magnet Machines," The Institution of Engineering and Technology, IET Electric Power Applications, IET Journals, vol. 10, Issue 7, Apr. 4, 2016, pp. 658-666.

Strobl, Simon, "Field Oriented Control (FOC) of Permanent Magnet Synchronous Machine (PMSM)," imperix power electronics, <https://imperix.com/doc/implementation/field-oriented-control-of-pmsm> Mar. 23, 2021, pp. 1-9.

U.S. Appl. No. 17/670,997, filed Feb. 14, 2022 by Peter J. Maloney, et al. for Systems and Methods for Rescaling Executable Simulation Models, 1-125.

* cited by examiner

SYSTEMS AND METHODS FOR RESCALING EXECUTABLE SIMULATION MODELS

BRIEF DESCRIPTION OF THE DRAWINGS

The description below refers to the accompanying drawings, of which.

DETAILED DESCRIPTION OF ILLUSTRATIVE EMBODIMENTS

Background

Figure 1:
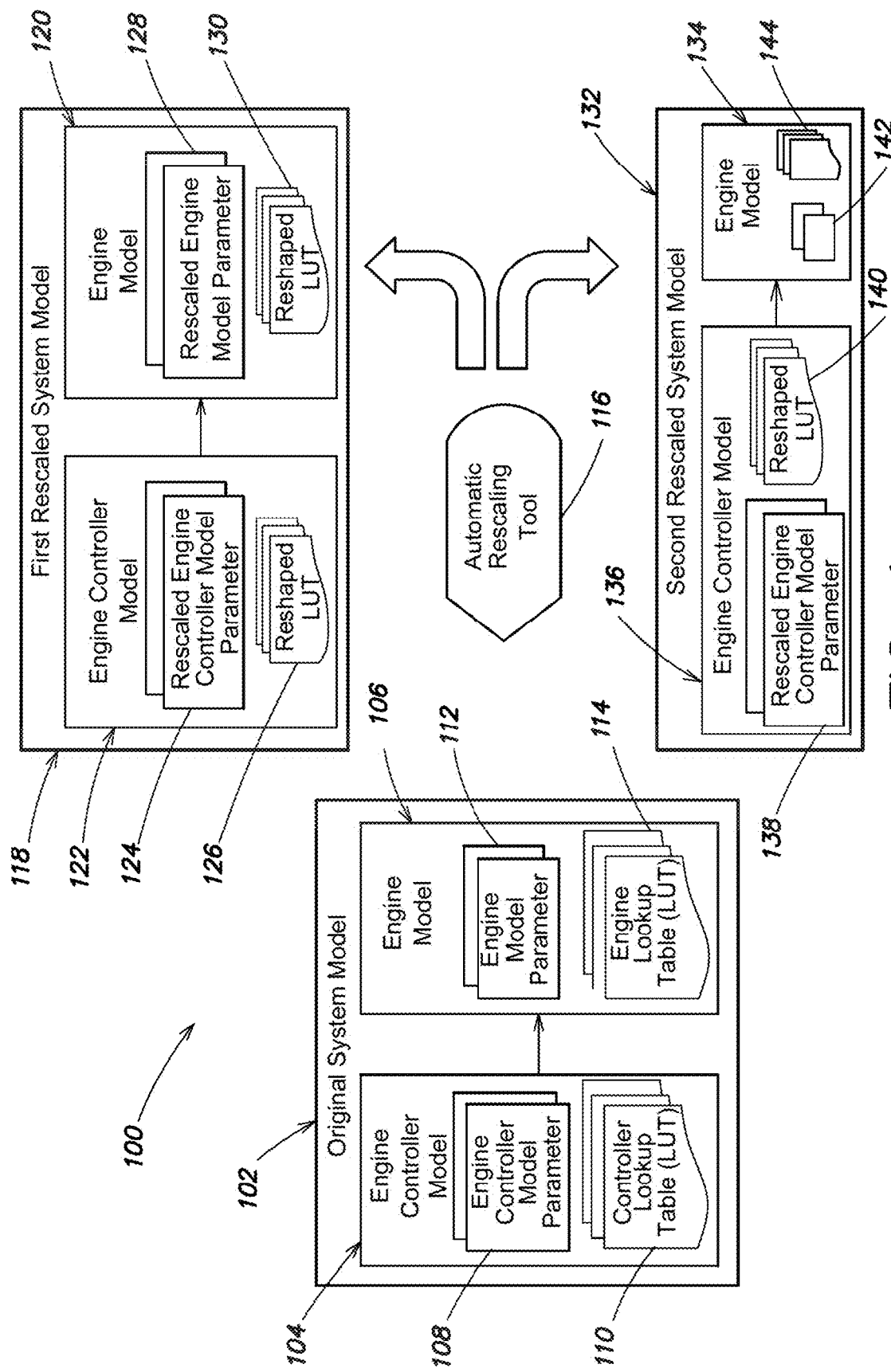
FIG. 1 is a schematic illustration of an example rescaling environment in accordance with an embodiment.

Computer-based modeling environments are often used in the design and development of systems, such as cars, appliances, airplanes, and other systems. For example, modeling environments may be used to design electronic control unit (ECU) embedded software for use in controlling an engine, such as an internal combustion, electric, or hybrid automobile powertrain. A developer may create an executable model of the ECU software within the modeling environment and pair it with the engine to reflect the behavior of the assembled engine/plant system. To develop and evaluate the ECU control software model, the developer may also create a model of the engine being controlled by the ECU, and may couple the ECU model to the engine model. The ECU and engine models may be executed, during which the ECU model may receive an input, such as a driver torque request, and may generate one or more engine commands, such as throttle position, fuel injector pulsewidth, spark advance, intake and exhaust cam phaser angles, etc. The engine model may receive the engine commands and produce engine output data, such as such as brake torque, manifold pressure, fuel flow, air mass flow, emissions, etc., in response to the engine commands from the ECU model. The ECU model may be evaluated and refined until it meets specifications established for the ECU and/or produces satisfactory control characteristics for the engine model, usually related to fuel economy, performance, and emission targets desired for a given vehicle application. When the ECU model and its associated calibration parameter set is developed to meet performance, fuel economy, and emission control specifications, code may be generated for the ECU model for final development in a Hardware-in-the-Loop (HIL) simulation and vehicle hardware application, at which point the control parameters will be fine-tuned in light of errors between the model of the engine plant and the real engine system before production release. For example, a code generator which may be part of the modeling environment may generate code, such as source code that implements the behavior of the ECU model. The generated code and calibration parameter set may be compiled and deployed onto a hardware platform, such as an embedded system, thereby realizing a physical ECU.

The engine model may be implemented as a lumped parameter model in which the behavior of the engine being modeled is represented by a network topology of model elements that collectively approximate the behavior of the engine under one or more assumptions. The model elements may model various engine components, such as a throttle, an intake manifold, an engine core, an exhaust manifold, an exhaust system, a turbocharger, etc. The model elements may be arranged and interconnected so as to define an engine architecture. The model elements may include settable parameters that govern the behavior of the model elements, such as throttle diameter for the throttle element, intake system area and volume for the intake manifold, exhaust system area and volume for the exhaust manifold, etc. In addition, an engine model may include engine lookup tables that are accessed during execution of the engine model to compute operating characteristics or other attributes. The lookup tables may incorporate nonlinear data of the engine being modeled. The controller model similarly may include settable controller parameters that govern its behavior during execution. The controller model also may include controller lookup tables containing nonlinear data that are accessed during execution of the controller model to obtain values used in calculating engine commands. The engine controller itself may also include a model of engine behavior used for virtual sensors as a replacement or diagnostic check on actual physical sensors with the same or lower detail as that used in the plant model.

An engine model may be highly sophisticated and capable of producing many engine outputs. An engine model may be the result of many months or even years of design work. Typically, an engine model models a physical engine of a particular architecture. The parameters of the engine model for a given architecture affect the size of the engine. For example, a given engine model may model a four cylinder, four stroke, spark ignition, 1.5 liter (L) turbocharged, dual cam-phased engine architecture. To create a model of an engine of a different size, e.g., a six cylinder, 9.8 L engine, a developer must create a completely new model that models the behavior of an engine of the new size. As noted, the creation of such a new engine model is a time-consuming process. This may delay development of a new controller design for the differently sized engine. To save development time, a developer may reuse a controller model whose parameters were created for one engine model with a different engine model for a different size engine. The use of such a mismatched engine/controller model parameters can result in unusable simulation results, halting further control development until the controller parameters are harmonized with the new engine design.

Overview

Briefly, the present disclosure relates to systems and methods for automatically rescaling an original engine model to create an engine model for an engine of a different size. The original engine model may be coupled to a model of an engine controller, and the systems and methods may also rescale the original controller model to produce a rescaled controller model matched to the rescaled engine model. The original engine model may include engine parameters and engine lookup tables, and the original controller model may include controller parameters and controller lookup tables. The systems and methods may receive one or more rescaling factors indicating the size of the new engine to be modeled, and may compute one or more rescaling ratios as a function of the one or more rescaling factors. For example, the systems and methods may compute power, torque, speed, and displaced volume ratios for the existing engine model and the rescaled engine model. The systems and methods may use the rescaling ratios to modify at least some of the engine parameters and controller parameters. For example, the systems and methods may use the engine torque ratio to rescale volume-based parameters and the engine power ratio to rescale area-based parameters. The systems and methods also may use one or more of the rescaling ratios to reshape at least some of the engine lookup tables and controller lookup tables. In addition to creating the rescaled engine model, the systems and methods may produce a rescaled controller model matched to the rescaled engine model, for example by utilizing the same rescaling ratios to modify the engine controller model's parameters and lookup tables.

The systems and methods may preserve the design and architecture of the original engine and controller models during the rescaling process. For example, the modified engine and controller parameters and the reshaped engine and controller lookup tables may be stored in one or more data structures, such as a configuration set or block parameters, and the original engine and controller models may utilize the modified engine and controller parameters and the reshaped engine and controller lookup tables stored in the configuration set during an execution.

In some embodiments, the systems and methods may additionally rescale a model of a dynamometer and the testing parameter range of the dynamometer model created for the original engine controller and engine models. The rescaled dynamometer model may be connected to the engine controller and engine models, and the engine controller parameters may be re-adjusted iteratively by the dynamometer software to remove stack-up errors between a controller command and an engine output result due to the rescale operation or pre-existing errors prior to the rescale operation. The engine controller and engine plant models may be re-tested after re-scale and stack-up error retune over a range of test points. Output data generated during the testing of the engine controller and engine models may be captured and stored. The systems and methods may utilize the captured output data to generate a plurality of static engine performance maps. The systems and methods may construct a mapped engine model that includes the static engine performance maps for example to act as a surrogate for the more computationally intensive dynamic engine model used in the re-size operation provided the dynamics of the engine can be neglected for a given powertrain development application of the static model.

FIG. 1 is a schematic illustration of an example rescaling environment 100. The rescaling environment 100 may include an original system model 102 that may include an original engine controller model 104 and an original engine model 106. The original engine controller model 104 may include one or more engine controller model parameters indicated at 108. In some implementations, the engine controller model 104 may include its own model in the form of an observer, a state estimator, or a virtual sensor of the engine that is being modeled by the engine model 106. In some implementations, the engine controller model 104 may include physical inverse state estimators, such as a barometric pressure estimator, throttle position estimator diagnostic function, EGR flow estimator for a CI engine, etc. The engine controller model 104 may utilize this engine model to generate engine commands, thus operating as a feedforward controller. For example, the engine controller model 104 may include one or more controller lookup tables (LUTs) indicated at 110. At least some of the LUTs 110, typically many of the LUTs 110, may model the engine being modeled by the engine model 106. The original engine model 106 may include one or more engine model parameters indicated at 112 and one or more engine LUTs indicated at 114. The original system model 102 may be executed. During execution, the engine controller model 104 may generate one or more engine commands, which may be received by the engine model 106. The engine model 106 may produce engine output data. The engine model 106 may model a physical engine of a particular size, for example an engine having a particular number of cylinders and a particular displacement.

An automatic rescaling tool 116 may rescale the original engine controller model 104 and the original engine model 106. For example, the automatic rescaling tool 116 may produce one rescaled system model 118 that includes a rescaled engine model 120 that models an engine larger in size than the engine modeled by the original engine model 106 and a rescaled engine controller model 122 that matches the rescaled engine model 120. In some embodiments, the automatic rescaling tool 116 may produce the rescaled engine controller model 122 by generating rescaled engine controller model parameters 124 and reshaped controller LUTs 126. The automatic rescaling tool 116 may produce the rescaled engine model 120 by generating rescaled engine model parameters 128 and reshaped engine LUTs 130. The automatic rescaling tool 116 may produce another rescaled system model 132 having another rescaled engine model 134 that models an engine smaller in size than the engine modeled by the original engine model 106 and another rescaled engine controller model 136 matched to the rescaled engine model 134. The automatic rescaling tool 116 may produce the rescaled engine controller model 136 by generating rescaled engine controller model parameters 138 and reshaped controller LUTs 140, and the rescaled engine model 134 by generating rescaled engine model parameters 142 and reshaped engine LUTs 144.

The automatic rescaling tool 116 may produce the rescaled models 120 and 122 for the larger size engine and/or the rescaled models 134 and 136 for the smaller sized engine quickly, e.g., in a matter of minutes, even for complex and/or sophisticated engine and controller models. Accordingly, developers can obtain and evaluate alternative engine/controller designs quickly and easily, as compared to the prior approach of laboriously creating entirely new engine and/or controller models.

Figure 2:
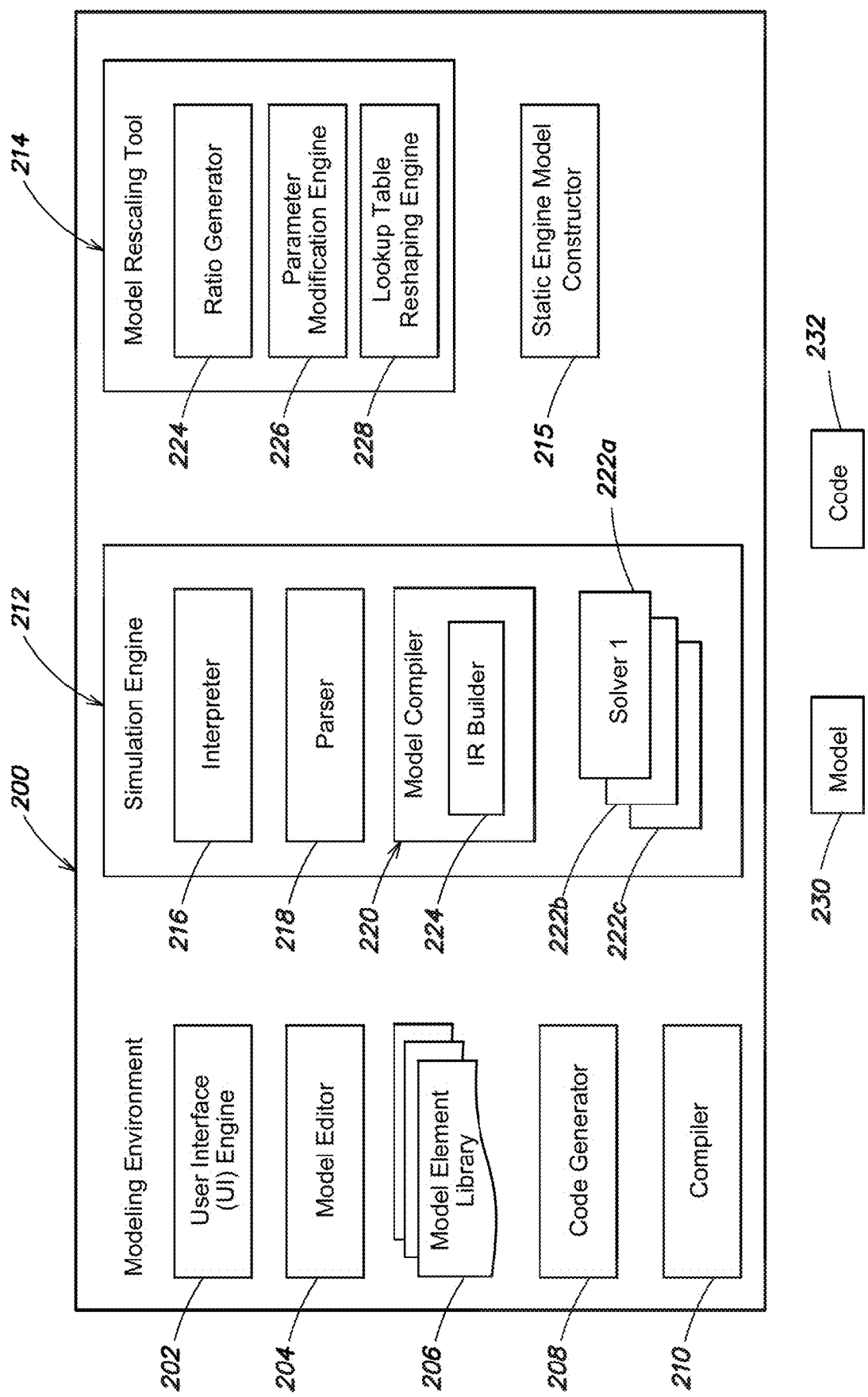
FIG. 2 is a partial, schematic illustration of a modeling environment in accordance with an embodiment.

FIG. 2 is a partial, schematic illustration of an example of a modeling environment 200 in accordance with an embodiment. The modeling environment 200 may include a User Interface (UI) engine 202, a model editor 204, one or more model element libraries indicated at 206, a code generator 208, a compiler 210, a simulation engine 212, a model rescaling tool 214, and a static engine model constructor 215. The UI engine 202 may create and present one or more User Interfaces (UIs), such as Graphical User Interfaces (GUIs) and/or Command Line Interfaces (CLIs), on a display of a data processing device, such as a workstation, laptop, tablet, etc. The GUIs and CLIs may provide a user interface to the modeling environment 200, such as a model editing window. The model editor 204 may perform selected operations on a model, such as open, create, edit, and save, in response to the user inputs or programmatically.

The simulation engine 212 may include an interpreter 216, a parser 218, a model compiler 220, and one or more solvers, such as solvers 222a-c. The model compiler 220 may include one or more Intermediate Representation (IR) builders, such as IR builder 224. In some implementations, one or more IR builders may be included or associated with the solvers 222. The simulation engine 212 may execute, e.g., compile and run or interpret, computer-generated, executable models using one or more of the solvers 222a-c. For example, the solvers 222 may generate a set of equations for a model, and may solve the set of equations. The solvers 222 may also generate a solution for an in-memory, intermediate representation (IR) of a model that represents a set of equations. The solvers 222 may generate the solution for the IR using numerical techniques. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2017 ed.)

The model rescaling tool 214 may include a ratio generator 224, a parameter modification engine 226, and a lookup table reshaping engine 228.

The code generator 208 may access a model, such as model 230, and may generate code, such as code 232, for the model 230. In some embodiments, the generated code may be source code, which may be compiled by the compiler 210, and executed by one or more processors outside of the modeling environment 200. The generated code may thus be standalone code relative to the modeling environment 200. Examples of generated code include Ada, Basic, C, C++, C#, FORTRAN, assembly code, and Hardware Description Language (HDL) code, such as VHDL, Verilog, or SystemC, among others, which may be used to synthesize a programmable logic device.

Exemplary modeling environments include the MATLAB® technical computing environment (TCE) and the Simulink® model-based design environment both from The MathWorks, Inc. of Natick, Mass., as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level modeling environment may contain less implementation detail, and thus operate at a higher level than certain programming languages, such as the C, C++, C#, and SystemC programming languages.

A given model may simulate, e.g., approximate the operation of, a system. Exemplary systems include physical systems, such as plants and controllers. A model may be executed in order to simulate the system being modeled, and the execution of a model may also be referred to as simulating the model. Models constructed within the modeling environment 200 may include textual models, graphical models, such as block diagrams, state-based models, discrete-event models, physical models, and combinations thereof. A graphical model may include icons or blocks that represent computations, functions or operations, and interconnecting lines or arrows among the blocks may represent data, signals, or relationships among those computations, functions, or operations. The icons or blocks, moreover, may be selected by the user from one or more of the libraries or palettes 206 that contain icons or blocks for the blocks supported by the modeling environment 200. A model editor GUI may include a Run button that may be selected by the user. The modeling environment 200 may also be configured to receive a run command entered by the user, e.g., in the GUI or in a Command Line Interface (CLI). In response to the user selecting the Run button or entering the run command, the simulation engine 212 may execute the model, and may present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 200 may implement a declarative language. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned once and only once. Examples of declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model may include computational implementations that are implicitly defined by a declarative language.

It should be understood that the modeling environment 200 is intended for illustrative purposes and that the present disclosure may be used with other modeling environments. For example in some implementations, the code generator 208 and/or the compiler 210 may be separate from the modeling environment 200.

One or more of the user interface engine 202, the model editor 204, the code generator 208, the compiler 210, the simulation engine 212, and the model rescaling tool 214 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the user interface engine 202, the model editor 204, the code generator 208, the compiler 210, the simulation engine 212, and the model rescaling tool 214 may comprise hardware registers and combinational logic configured and arranged to produce sequential logic circuits. In some embodiments, various combinations of software and hardware, including firmware, may be utilized to implement the described methods.

Suitable code generators for use with the present disclosure include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers may be used.

Figure 3:
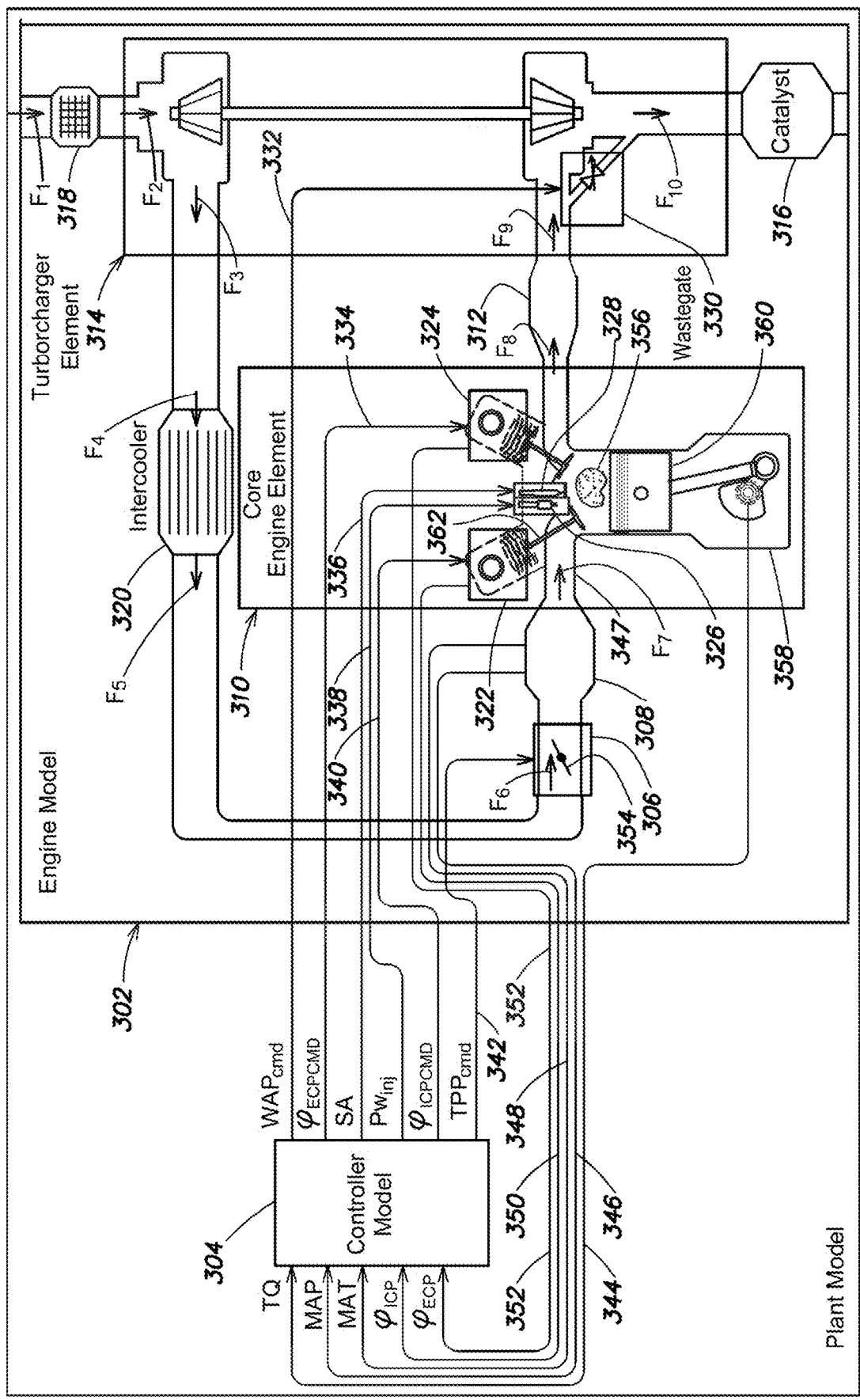
FIG. 3 is a schematic illustration of an example of a system model in accordance with an embodiment.

FIG. 3 is a schematic illustration of an example of a system model 300. The system model 300 may include an engine plant model 302 and a controller model 304. The engine plant model 302 may model the operation of a spark ignition or compression ignition, internal combustion engine, and the controller model 304 may model the operation of an electronic control unit (ECU) for the engine represented by the engine model 302. The engine plant model 302 may include a throttle element 306, an intake manifold element 308, a core engine element 310, an exhaust manifold element 312, a turbocharger element 314, an exhaust aftertreatment system element 316, an air intake element 318, and an intercooler element 320. The core engine block element 310 may include an intake cam phaser element 322, an exhaust cam phaser element 324, a spark plug element 328, and a fuel injector element 326. The turbocharger element 314 may include a wastegate or variable geometry turbine element 330, for bypassing the turbocharger element 314 and allowing exhaust gases to flow directly to the exhaust element 316. Additional engine breathing-related actuators may also include variable intake runner length, variable intake manifold flap open/close, variable compression ratio actuation, variable intake valve lift actuation, two-step valve intake valve lift actuation, high pressure exhaust gas recirculation (EGR) valve actuation, low-pressure EGR actuation, and fuel vapor canister purge actuation, among others.

During execution of the system model 300, the controller model 304 may receive an input, such as a torque request, and may generate a plurality of engine commands that are provided to the engine model 302 to achieve that torque request when the relationship between the torque request and the resulting torque is established via calibration parameters and LUT tables. The engine model 302 may generate a plurality of engine outputs and some of the engine outputs may be provided as feedback to the controller model 304 via sensor models. For example, the controller model 304 may generate a wastegate area command ($WAP_{cmd}$) 332 for controlling the wastegate element 330, an exhaust cam phaser angle command ($\varphi_{ECPCMD}$) 334 for controlling the exhaust cam element 324, a spark advance command (SA) 336, for controlling the spark plug element 328, vectorized multiple injection timing parameters (SOI), vectorized fuel injector pulsewidth commands ($PW_{inj}$) 338 or vectorized multiple fuel mass per inject command (Fmass) for controlling the fuel injector element 326, an intake cam phaser angle command (φICPCMD) 340 for controlling the intake cam element 322, and a throttle position percent command (TPPcmd) 342 for controlling the throttle element 306. The engine model 302 may generate an engine torque response signal (TQ) 344, an intake manifold pressure signal (MAP) 346, an intake manifold temperature signal (MAT) 348, an intake cam phaser angle signal (($\varphi_{ICP}$)) 350, and an exhaust cam phaser angle signal ($\varphi_{ECP}$) 352 that are provided to the controller model 304.

In some embodiments, the engine model 300 may be implemented as a lumped parameter model in which the behavior of the engine being modeled is represented by discrete entities that approximate the behavior of the engine under one or more assumptions arranged in a network topology.

The engine model 302 may represent the spark ignition engine and/or compression ignition engine as an interdependent network of gas mass flows designated by arrows labeled as $F_1$ to $F_{10}$ between a network of pneumatic volume elements or nodes. For example, inlet air at atmospheric pressure may pass through the air intake element 318, which may include an air cleaner, and into a compressor portion of the turbocharger element 314. The inlet air may then flow through the intercooler element 320. Compressed and cooled inlet air may be drawn through the throttle element 306 in which is rotatably disposed an inlet air valve in the form of a throttle plate 354 the position of which may be electronically controlled by the TPPcmd 342 to vary restriction to inlet air passing through the throttle element 306 and into the intake manifold element 308. A pressure transducer may measure gas pressure in the intake manifold element 308, and provide the MAP output signal 346.

Individual cylinder intake runners, one of which is illustrated in FIG. 3 at 347, may open into a combustion chamber of a respective engine cylinder via fixed or variable intake valve restrictions affected by intake cam phasing actuators and lift actuators. One combustion chamber of one respective cylinder is shown in FIG. 3. Each cylinder may include intake and exhaust valves, combustion chamber 356 and a crankcase 358, separated by a piston 360, which may sealingly engage the wall of the cylinder. A quantity of fuel may be injected to the intake port upstream of the intake valve or directly into the cylinder, via the fuel injector element 328, in response to one or more $PW_{inj}$ signals 338 for mixing with the inlet air. The resulting mixture may be drawn into the combustion chamber 356 during a cylinder intake event, in which an intake valve 362 is driven to an open position and a low pressure condition is present in the combustion chamber. The air-fuel mixture may be ignited in the combustion chamber 356 during a combustion event as the mixture is later compressed, and initiated by a timed ignition arc at the spark plug element 328, which extends into the combustion chamber 356. Alternatively, for compression ignition engines, one or more precisely timed fuel injector deliveries of fuel to the cylinder may be used to initiate combustion. The piston 360 within the cylinder may be reciprocally driven under the effective pressure of the combustion event. The generated power may be used to drive vehicle wheels, accessory loads, etc. Gasses produced in the combustion process within the combustion chamber may be exhausted from the combustion chamber 356 during a cylinder exhaust event. The exhaust gases may pass through exhaust runners to the exhaust manifold element 312. The exhaust gasses may flow through the exhaust manifold 312 to a turbine portion of the turbocharger element 314. In some cases, an exhaust throttle valve element may be used to increase back-pressure to increase combustion temperature during start-up. After passing through the exhaust throttle, exhaust gases may then flow to the exhaust aftertreatment system element 316, which may include a catalytic treatment device, diesel oxidation catalyst, diesel particulate filter, gasoline particulate filter, lean NOx trap, and a muffler, and from there to the atmosphere.

Parameters specifying values for volume, area, and mass flow may be associated with at least some of the elements of the engine model 302 to represent the flow of intake air and exhaust gases through the engine model 300.

Figure 4:
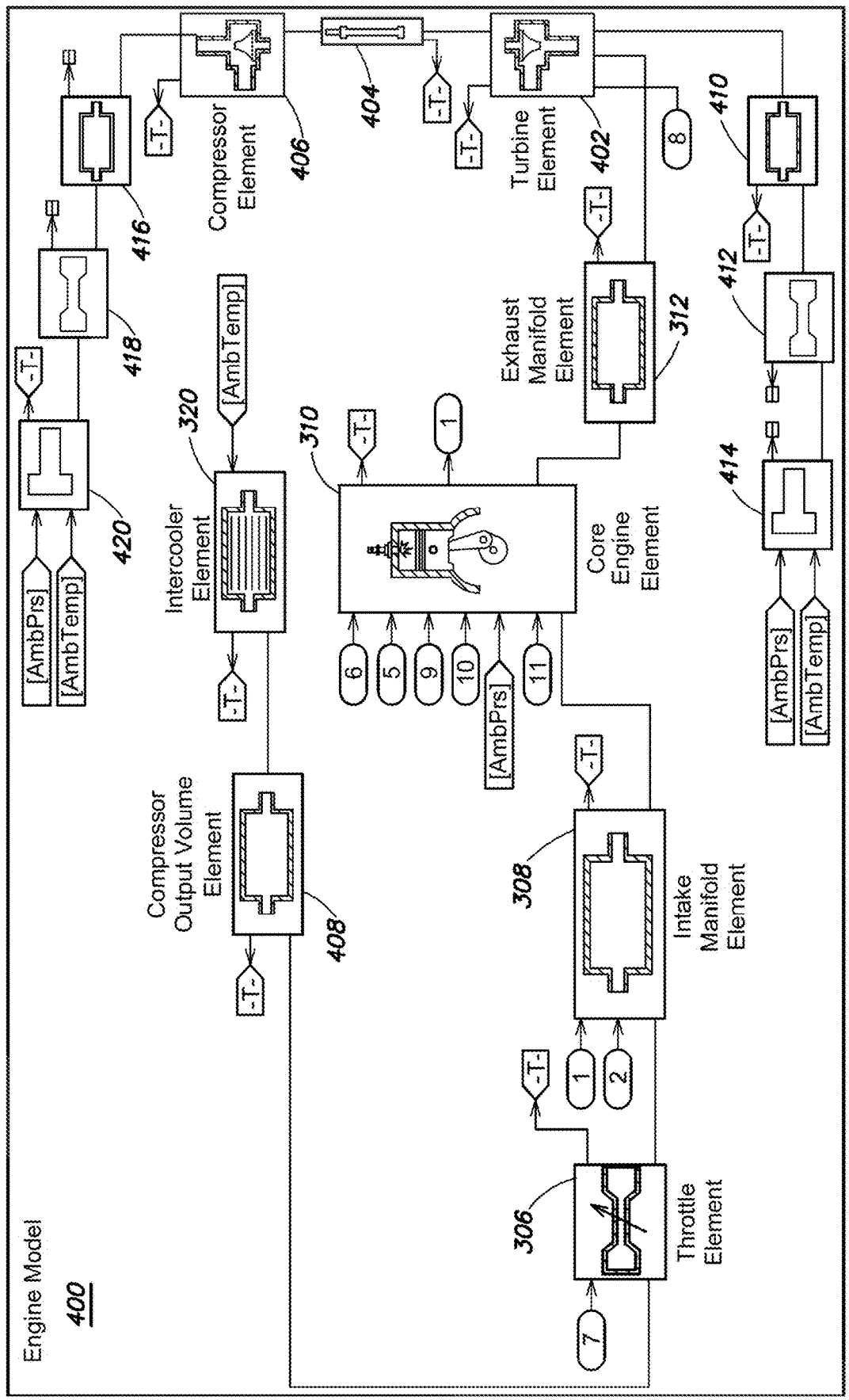
FIG. 4 is a schematic illustration of an example of an engine model in accordance with an embodiment.

FIG. 4 is a schematic illustration of another example of an engine model 400. The engine model 400 includes the throttle element 306, the intake manifold element 308, the core engine element 310, the exhaust manifold element 312, and the intercooler element 320. The engine model 400 further includes a turbine element 402, a turbine shaft element 404, a compressor element 406, and a compressor output volume element 408. To model an engine's exhaust system, the engine model 400 may include an exhaust system volume element 410, an exhaust back pressure element 412, and an environmental exhaust element 414. To model an engine's air intake system, the engine model 400 may include an air intake system element 416, an air filter element 418, and an environmental intake element 420.

Suitable engine controller and engine models include the engine controller model and the engine model provided in the Spark Ignition (SI) Engine Dynamometer Reference Application, the Compression Ignition (CI) Engine Dynamometer Reference Application, the SI Controller block, the SI Core Engine block, the CI Controller block, and the CI Core Engine block all from The MathWorks, Inc. The SI and CI Controller blocks include engine models in the form of lookup tables and dynamic elements, and operate as feedforward controllers. It should be understood that the present disclosure may be utilized with other controller designs such as those used for full ECU software emulation, and may also be used to re-scale dynamic feedback parameters such as controller and estimator gains.

Elements of an engine model, such as the engine models 302 and 400, may include one or more parameters. Values assigned to the parameters may control and/or affect the behavior of the respective elements. For example, some elements of an engine model through which intake air or exhaust gases flow may include parameters defining flow area and/or volume. The throttle element 306 may include a throttle diameter parameter (ThrDiam) in $m^2$. The intake manifold element 308 may include an intake manifold chamber volume parameter (Vint) in $m^3$. The core engine element 310 may include a number of cylinders parameter (NumCyl), a displaced engine volume parameter (Vd) in $m^3$, and an injector slope parameter (InjSlp) in mg/ms. The exhaust manifold element 312 may include an exhaust manifold chamber volume (Vexh) in $m^3$. The turbine shaft element 404 may include a shaft inertia parameter (TurboInertia) in $kg*m^2$. In some embodiments, turbines and compressors may be grouped in stages. The air intake system element 416 may include an air intake chamber volume parameter (AirIntakeVol) in $m^3$. The turbine element 402 may include a wastegate area parameter (WgArea) in $m^2$. Alternatively, the turbocharger flow can be controlled by a variable geometry turbine (VGT) rack position actuator. The exhaust system volume element 410 may include an exhaust chamber volume parameter (ExhSysVol) in $m^3$. The compressor output volume element 408 may include a compressor chamber volume parameter (VolCompOut) in $m^3$.

It should be understood that an engine model, such as engine models 300 and/or 400, may include additional and/or other parameters.

A controller model, such as the controller model 304, may include one or more parameters. For example, the controller model 304 may include a number of cylinders parameter (NumCyl) and an engine displaced volume parameter (Vd) in $m^3$, among others.

In some embodiments, the modeling environment 200 may create a workspace for a model, such as the system model 300, when the model is opened and/or loaded from memory. The workspace may be a region of memory for storing variables used by the system model 300. The variables may be assigned to one or more of the model's parameters. For example, the variable Vd may be assigned to the engine displayed volume parameter. To obtain the value of the engine displayed volume parameter, the controller model 304 and/or the engine model 302 may look up the value assigned to this variable in the workspace. The UI engine 202 may create a workspace pane as part of an editor window that may present and provide access to variables. For example, variables in the workspace may be accessed from a command line of the editor window by a user of the modeling environment 200. Variables in the workspace may be named and may be associated with meta information, such as the variables' dimensions, when the variables were created, the variables' data type, etc. The workspace or a portion thereof may be saved to one or more data structures, such as a MAT file, an HDF5 file, etc.

In some embodiments, one or more workspaces may be created for a model, and the one or more workspaces may have different scopes or contexts. For example, one workspace may be created for a sub-model included within a parent model, and the variables of this workspace may be accessible only by the sub-model. Workspaces also may be created for other hierarchical model structures, such as a subsystem, which may represent a plurality of model elements as a single model element, e.g., a subsystem block. Variables included in a workspace for a subsystem may only be accessible by the model elements included in the subsystem.

In some embodiments, the controller model 304 and/or one or more elements of the engine model 302 may include and/or access one or more lookup tables, which may also be referred to as performance tables and/or calibration maps, during execution. Lookup tables utilized by an engine model may store nonlinear engine behavior data that may be used to determine the engine model's response to control inputs. Lookup tables utilized by an engine controller model may store optimal control commands for given engine operating points.

In general, a lookup table may relate controller command input values to controller output values that will yield a desired response in the engine plant under quasi-steady and dynamic engine operating conditions. A lookup table may include one or more input breakpoint data sets and output table data. Each input breakpoint data set may be an index of input values for a particular dimension of the lookup table. The input breakpoint data sets relate a lookup table's input values to the output values that the table returns. The individual input values included in an input breakpoint data set may be referred to as breakpoints. The breakpoints may define intervals at which the input values may fall, and may be non-repeating, monotonically increasing values. An input breakpoint data set may also be referred to as an input breakpoint data grid. For given input data, the breakpoints in input breakpoint data sets corresponding to the input data may be used to locate an output data value. The breakpoints of a lookup table may serve to partition the table input space into regions, which may be called "cells". Each cell, which can be multi-dimensional, may be delimited by two breakpoints for each indexing variable. If a lookup table does not define a particular input value, it may estimate the output value based on nearby table values using interpolation or extrapolation techniques.

The output data of a lookup table may be obtained experimentally by running a physical engine in a lab and collecting test data or by running a simulation of an engine model and collecting simulation results. Lookup tables utilized by the engine controller and the engine models often include non-linear data in order to reflect the deliberate design of engine hardware, which exhibits such nonlinear behavior.

Figure 5:
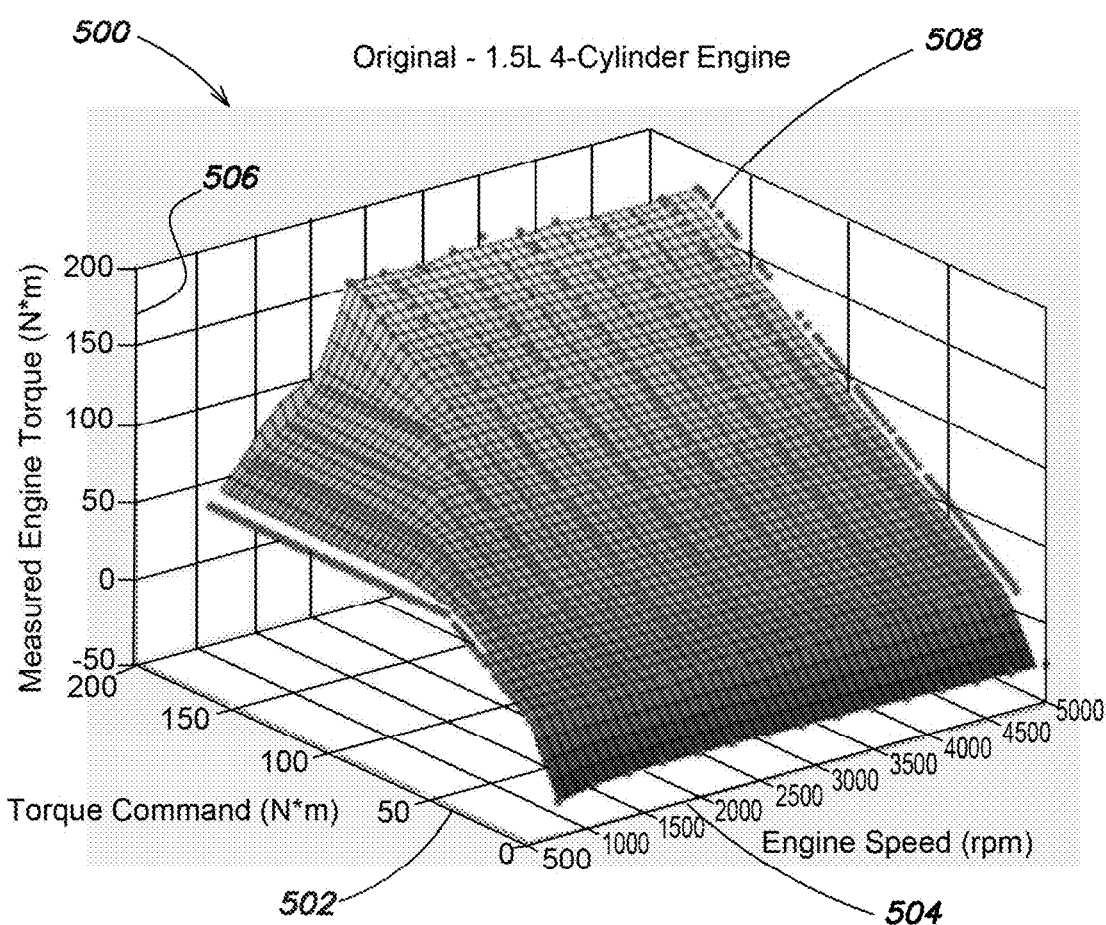
FIG. 5 is a schematic illustration of an example lookup table for use by an original engine model in accordance with an embodiment.

FIG. 5 is a schematic illustration of a lookup table 500 that may be utilized by an engine model to obtain engine brake torque as a function of engine speed and a torque command or fuel mass per injection command. The table 500 includes a torque command axis 502, an engine speed axis 504, and a measured engine torque, e.g., engine brake torque, axis 506. The table 500 further includes output data 508.

Figure 6:
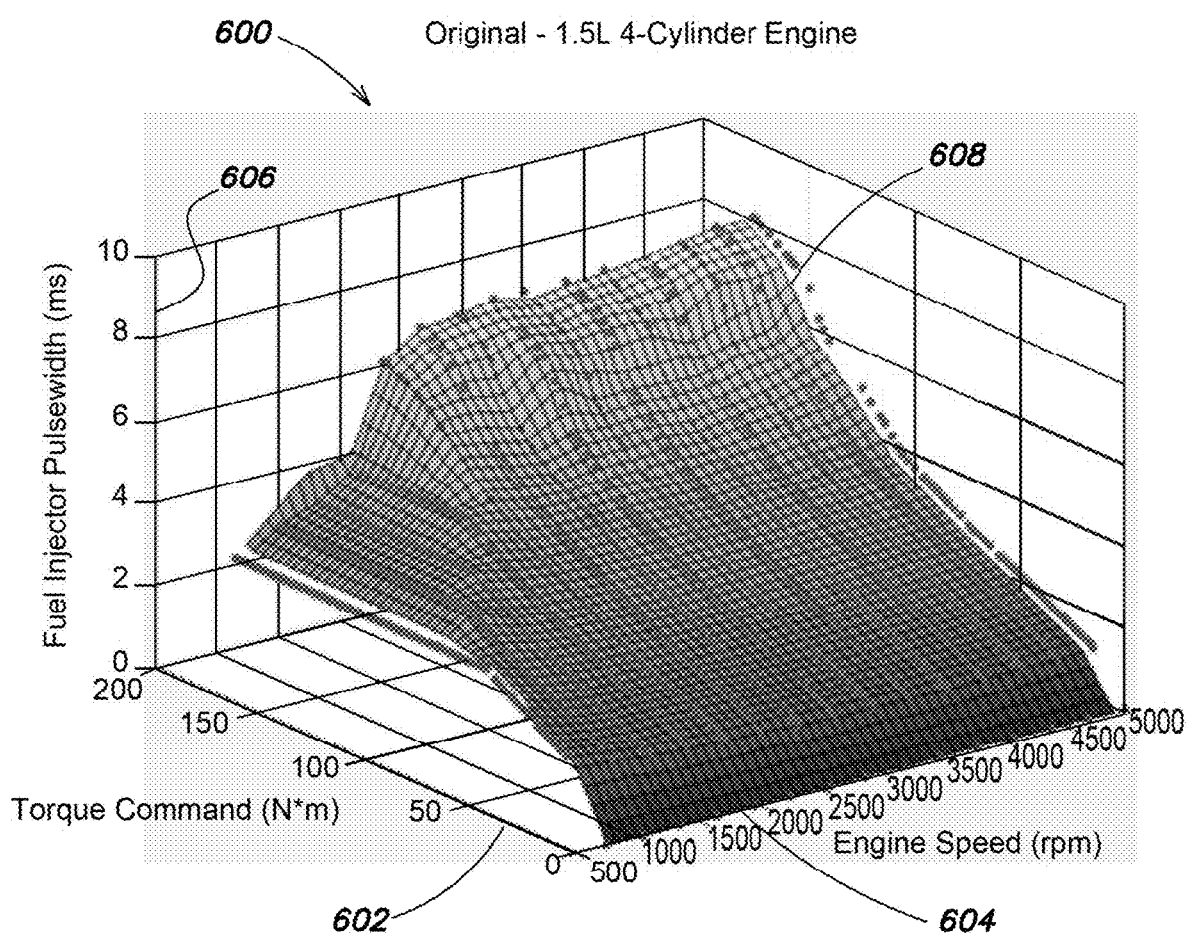
FIG. 6 is a schematic illustration of an example lookup table for use by an original engine controller model in accordance with an embodiment.

FIG. 6 is a schematic illustration of a lookup table 600 that may be utilized by an engine controller model to obtain an injector pulsewidth command or fuel mass per injection per cylinder command for a fuel injector as a function of a torque command and engine speed. The table 600 includes a torque command axis 602, an engine speed axis 604, and a fuel injector pulsewidth axis 606. The table 600 further includes output data 608.

Tables 500 and 600 may correspond to a 1.5 L four cylinder spark ignition turbocharged dual cam-phased engine and matching controller.

FIGS. 7A-E are partial views of a flow diagram of an example method in accordance with an embodiment. The flow diagram of FIGS. 7A-E is intended for illustrative purposes only. In some embodiments, one or more steps may be omitted, additional steps may be added, the order of steps may be changed, and/or one or more sequences as indicated by the arrows of FIGS. 7A-E may be omitted.

The model rescaling tool 214 may receive one or more linear and/or nonlinear rescaling factors, as indicated at step 702. The one or more rescaling factors may indicate the new size of an engine to be modeled. Exemplary rescaling factors include maximum engine power number of cylinders of the resized engine. The one or more rescaling factors may be user specified or they may be automatically derived from criteria that may be user specified, for example through one or more GUIs created by the UI engine 202, as described herein.

The ratio generator 224 may compute one or more ratios, as indicated at step 704. The computed ratios may provide relationships between the engine size represented by the original model and the engine size to be represented by the rescaled engine model. The determination of the ratios may be based upon one or more assumptions for the engines. One assumption may be that the original engine and the rescaled engine have constant engine geometry proportions, for example in terms of bore, which is the cylinder internal diameter, to stroke ratio. Another assumption may be that the ratio of swept volumes, e.g., engine displacements, of the original and the rescaled engines is known, for example it is specified by the user. Yet another assumption may be that engine torque is proportional to total engine displacement with a power level increase from the original engine to the rescaled engine. Based on these assumptions, the ratio generator 224 may compute the following ratios:

1) Engine Power Ratio ($EngPwrRatio$) =
$$\frac{\text{(maximum power of rescaled engine)}}{\text{(maximum power of original engine)}}$$

2) Engine Cylinder Number Ratio ($EngCylNumRatio$) =
$$\frac{\text{(number of cylinders of rescaled engine)}}{\text{(number of cylinders of original engine)}}$$

3) Engine Speed Ratio ($EngSpdRatio$) = $\sqrt{\dfrac{EngCylNumRatio}{EngPwrRatio}}$ 4) Engine Torque Ratio ($EngTrqRatio$) = $\dfrac{EngPwrRatio}{EngSpdRatio}$ 5) Engine Displacement Ratio ($EngDispRatio$) =
$$\frac{EngCylNumRatio}{EngSpdRatio^3} = EngTrqRatio$$

6) Engine Cylinder Volume Ratio ($EngCylVolRatio$) =
$$\frac{\text{(Total Displaced Volume of original engine)} * EngTrqRatio/\text{number of cylinders of rescaled engine}}{\text{Total Displaced Volume of original engine}/\text{number of cylinders of original engine}}$$

The model rescaling tool 214 may preserve the structural design of the original controller model and the original engine model during the rescaling process, as indicated at step 706. For example, the rescaling tool 214 may not add any new model elements, remove any existing model elements, or change any connections among existing model elements in the original engine model and the original engine controller model. In some embodiments, the model rescaling tool 214 may preserve the structural design of the original models by reusing the original engine controller and engine models. For example, the model rescaling tool 214 may accomplish the rescaling process by directing the original engine and engine controller models to utilize new, rescaled parameter values computed by the model rescaling tool 214 and new, reshaped lookup tables created by the model rescaling tool 214 in place of the original parameters and original lookup tables. Reshaping operations can include not only rescaling of breakpoint parameters, but also nonlinear breakpoint spacing rearrangements to focus the lookup tables in specific regions of high nonlinearity. The model rescaling tool 214 may store new, rescaled parameter values and reshaped lookup tables in a data structure, such as a file, a container object, a workspace variable, etc., and direct the engine and engine controller models to utilize the information in that data structure during execution. In other embodiments, the model rescaling tool 214 may create a new, rescaled engine model and/or a new, rescaled engine controller model that are separate from the original engine model and/or the engine controller model. For example the model rescaling tool 214 may create copies of the original engine model and the original controller model, and may assign the new, rescaled parameter values and the new, reshaped lookup tables to the new, rescaled engine and engine controller models.

The parameter modification engine 226 may assign one or more of the received rescaling factors, such as the number of cylinders and the maximum engine power, to the rescaled engine model and the rescaled controller model, as indicated at step 708. The parameter modification engine 226 may compute new values for volume-based parameters associated with one or more of the rescaled engine model elements as a function of one or more of the determined ratios, such as the EngTrqRatio, among others, as indicated at step 710. For example, the parameter modification engine 226 may compute a rescaled total displaced volume (Vd) parameter, a compressor volume (VolCompOut) parameter, an intake manifold chamber volume (Vint), a cylinder volume at intake valve close volume (f_vivc) parameter vector computed as a function of intake cam phasing, and an exhaust manifold chamber volume (Vexh) parameter, for the rescaled engine model as follows:

Vd of rescaled engine model=Vd of original engine model*EngTrqRatio

VolCompOut of rescaled engine model=VolCompOut of original engine model*EngDispRatio Vint of rescaled engine model=Vint of original engine model*EngDispRatio f_vivc of rescaled engine model=f_vivc of original engine model*EngCylVolRatio Vexh of rescaled engine model=Vexh of original engine model*EngDispRatio.

The parameter modification engine 226 may compute new values for volume-based parameters associated with the rescaled engine controller model as a function of one or more of the determined ratios, as indicated at step 712. For example, the rescaled engine controller model may utilize a total displaced volume (Vd) and a cylinder volume at intake valve close volume (f_vivc) parameter vector during execution, among others. The parameter modification engine 226 may compute rescaled volume-based parameters for the rescaled engine controller model as follows:

Vd of rescaled engine controller model=rescaled Vd computed for rescaled engine model f_vivc of rescaled engine controller model=f_vivc of original engine controller model*EngCylVolRatio The parameter modification engine 226 may compute new values for area-based parameters associated with one or more of the elements of the rescaled engine model as function of one or more of the determined ratios, such as the EngPwrRatio, among others, as indicated at step 714. For example, the parameter modification engine 226 may compute a rescaled intake system area (AirFilterArea), a rescaled throttle bore diameter (ThrDiam), a rescaled exhaust system area (ExhSysArea), and a rescaled wastegate area parameter (WgArea), for the rescaled engine model as follows:

AirFilterArea of rescaled engine model=AirFilterArea of original engine model*EngPwrRatio ThrDiam of rescaled engine model=(ThrDiam of original engine model)$^2$*EngPwrRatio ExhSysArea of rescaled engine model=ExhSysArea of original engine model*EngPwrRatio WgArea of rescaled engine model=WgArea of original engine model*EngPwrRatio The parameter modification engine 226 may compute new values for area-based parameters of the rescaled engine controller model as a function of one or more of the determined ratios, for example the power ratio, as indicated at step 716.

The parameter modification engine 226 may compute new values for parameters associated with the fuel injector element of the rescaled engine model as a function of one or more of the determined ratios, as indicated at step 718. The parameter modification engine 226 also may compute new values for parameters associated with the fuel injector element of the rescaled engine controller model as a function of one or more of the determined ratios, as indicated at step 720. For example, the parameter modification engine 226 may compute one or more rescaled fuel injector slopes which determine the fuel mass delivered vs injector open time (InjSlp) as follows:

InjSlp of rescaled engine model=InjSlp of original engine model*EngCylVolRatio

InjSlp of rescaled engine controller model=InjSlp of original engine controller model*EngCylVolRatio The parameter modification engine 226 may compute new values for parameters associated with the turbocharger element of the rescaled engine model as a function of one or more of the determined ratios, as indicated at step 722. For example, the parameter modification engine 226 may compute a rescaled turbine shaft inertia parameter (TurboInertia) as follows:

TurboInertia of rescaled engine model=TurboInertia of original engine model*EngPwrRatio. The turbocharger compressor and turbine flow characteristic maps may be scaled by engine power ratio to reflect the proportional scaling of turbocharger and compressor with engine breathing and power. The turbocharger speed breakpoints may be rescaled to account for the larger turbine and correspondingly larger compressor blade tip radius by $$TurboSpeedRatio = \sqrt{\frac{1}{EngPwrRatio}}.$$

The original and rescaled engine controller models may include functionality, such as PID control functionality, for controlling the idle speed of the respective engine model. This PID control functionality may utilize a target engine idle speed parameter. The parameter modification engine 226 may compute a new target idle speed parameter for the rescaled engine controller model, as indicated at step 724. For example, the parameter modification engine 226 may compute a rescaled target idle speed parameter as follows:

target idle speed parameter of rescaled engine controller model=target idle speed parameter of original engine controller model*EngSpdRatio The parameter modification engine 226 may compute new values for air mass flow-based parameters associated with one or more of the model engine elements as a function of one or more of the determined ratios, as indicated at step 726. For example, the parameter modification engine 226 may compute a rescaled compressor mass flow rate (CompMassFlwRate) and a rescaled turbine mass flow rate (TurbMassFlwRate) for the rescaled engine model as follows:

CompMassFlwRate of rescaled engine model=CompMassFlwRate of original engine model*EngPwrRatio TurbMassFlwRate of the rescaled engine model=TurbMassFlwRate of original engine model*EngPwrRatio The parameter modification engine 226 may compute new values for mass flow-based parameters associated with the engine controller model as a function of one or more of the determined ratios, as indicated at step 728.

The lookup table reshaping engine 228 may create one or more reshaped lookup tables for the rescaled engine model, as indicated at step 730, and one or more reshaped lookup tables for the rescaled engine controller model, as indicated at step 732. The lookup table reshaping engine 228 may create reshaped lookup tables by scaling one or more of the original table's input breakpoint data sets and/or the original table's output data as a function of one or more of the determined the ratios. For example, the lookup table reshaping engine 228 may modify one or more of the dimensions of a LUT, e.g., the x dimension, the x and y dimensions, the x, y, and z dimensions, etc., as a function of one or more of the ratios.

An engine model may utilize one or more lookup tables to determine engine air mass flow. For example, an engine model may include a dual variable cam phasing form of air mass flow estimation model. This air mass flow estimation model may include an air mass flow table whose two input data breakpoints sets represent exhaust cam phaser angle (in degrees of crank retard) and trapped mass flow rate (f_mdot_trpd_bpt), and whose output data is engine air mass flow (f_mdot_air). The lookup table reshaping engine 228 may create a reshaped air mass flow table for the rescaled engine model as follows:

f_mdot_trpd_bpt of reshaped lookup table=f_mdot_trpd_bpt of original lookup table*EngPwrRatio; and f_mdot_air of reshaped lookup table=f_mdot_air of original lookup table*EngPwrRatio.

An engine controller model also may utilize one or more lookup tables to determine engine air mass flow. For example, an engine controller model may include a dual variable cam phasing form of air mass flow estimation model. This air mass flow estimation model may include an air mass flow table whose two input data breakpoints sets represent exhaust cam phaser angle (in degrees of crank retard) and trapped mass flow rate (TrpdMassFlwBpt), and whose output data is engine air mass flow (AirMassFlw). The lookup table reshaping engine 228 may create a reshaped air mass flow table for the rescaled engine controller model as follows:

TrpdMassFlwBpt of reshaped lookup table=TrpdMassFlwBpt of original lookup table*EngPwrRatio; and AirMassFlw of reshaped lookup table=AirMassFlw of original lookup table*EngPwrRatio.

An engine model may also include a plurality of lookup tables having input breakpoint data sets for torque, such as commanded torque, and engine speed. The lookup table reshaping engine 228 may scale the original breakpoints included in the original commanded torque breakpoint data sets by multiplying each breakpoint by the EngTrqRatio. The lookup table reshaping engine 228 may scale the original breakpoints included in the original engine speed breakpoint data sets by multiplying each breakpoint by the EngSpdRatio. The lookup table reshaping engine 228 may scale the original breakpoints included in the original commanded torque breakpoint data sets by multiplying each breakpoint by the EngTrqRatio.

The lookup table reshaping engine 228 may scale breakpoints included in friction-related breakpoint data sets used by an engine model by multiplying the breakpoints by the EngTrqRatio. For example, an engine model may include a friction torque lookup table whose input breakpoint data sets represent engine speed and engine load, and whose output data is friction torque. The lookup table reshaping engine 228 may multiply the original engine speed breakpoints by the EngSpdRatio, and may multiply the original friction torque output data values by the EngTrqRatio.

One or more LUTs utilized by an engine plant model and/or an engine controller model may include a load axis or dimension. The load values may be dimensionless, normalized values and may thus be independent of engine size. Accordingly, the lookup table reshaping engine 228 may not modify the load axis or dimension of a LUT during reshaping.

An engine controller model may also include a plurality of lookup tables having input breakpoint data sets for torque, such as commanded torque, and engine speed. Additional load-related breakpoints can be commanded normalized cylinder unburned air mass (load) and commanded total injected fuel mass. The lookup table reshaping engine 228 may scale the original breakpoints included in the original commanded torque breakpoint data sets by multiplying each breakpoint by the determined EngTrqRatio and additionally by changing the spacing of the breakpoints in an optimal nonlinear fashion so as to focus a given table in a region of high nonlinearity. The lookup table reshaping engine 228 may scale the original breakpoints included in the original engine speed breakpoint data sets by multiplying each breakpoint by the EngSpdRatio and additionally by changing the spacing of the breakpoints in an optimal nonlinear fashion so as to focus a given table in a region of high nonlinearity. The lookup table reshaping engine 228 may scale the original breakpoints included in the original commanded torque breakpoint data sets by multiplying each breakpoint by the EngTrqRatio.

The lookup table reshaping engine 228 may scale breakpoints included in friction-related breakpoint data sets of lookup tables used by an engine controller model by multiplying the original breakpoints by the EngTrqRatio. For example, an engine model may include a friction torque lookup table whose input breakpoint data sets represent engine speed and engine load, and whose output data is friction torque. The lookup table reshaping engine 228 may multiply the original engine speed breakpoints by the EngSpdRatio, and may multiply the original friction torque output data values by the EngTrqRatio.

In some embodiments, the lookup table reshaping engine 228 may calibrate or tune rescaled breakpoints, as indicated at step 734. For example, following the rescaling of breakpoints of a lookup table utilized by the rescaled engine model, there may be a mismatch between a corresponding rescaled table utilized by the rescaled engine controller model. The lookup table reshaping engine 228 may identify such mismatches and calibrate or tune either or both tables so that they match by assigning all of the error to one or more adjustable controller parameters, such as throttle area percent and wastegate area percent for a SI engine, and injected fuel mass, VGT rack position, and high pressure EGR valve area percent for a CI engine. Iterative algorithms are and may be used to arrive at numerically precise solutions for the adjustable controller parameters intended to remove stackup errors, such as StateFlow heuristic algorithms and MATLAB-based numerical optimization algorithms. For example, in a SI Engine Dynamometer reference example, StateFlow heuristic rules may be used to adjust the highly nonlinear throttle area percent lookup table parameters at each operating point of the engine to match engine measured torque response to commanded torque response where possible. If torque is not met at wide open throttle, the algorithm may begin closing the turbocharger wastegate to increase boost up to the boost and/or temperature limit of the engine to meet a commanded torque. At operating points where limited engine breathing decreases the peak torque available, or where turborcharger maximum speed limits are reached, the algorithm may stop at the limit, and the engine delivers less torque than the desired torque. For compression ignition CI engines, fuel mass per inject per cylinder plays a similar role to throttle position on the SI engine, and VGT rack position plays a similar role to wastegate area percent on a SI engine. EGR valve area percent may be used to meet EGR flow requirements in NOx control as a constraint.

Figure 8:
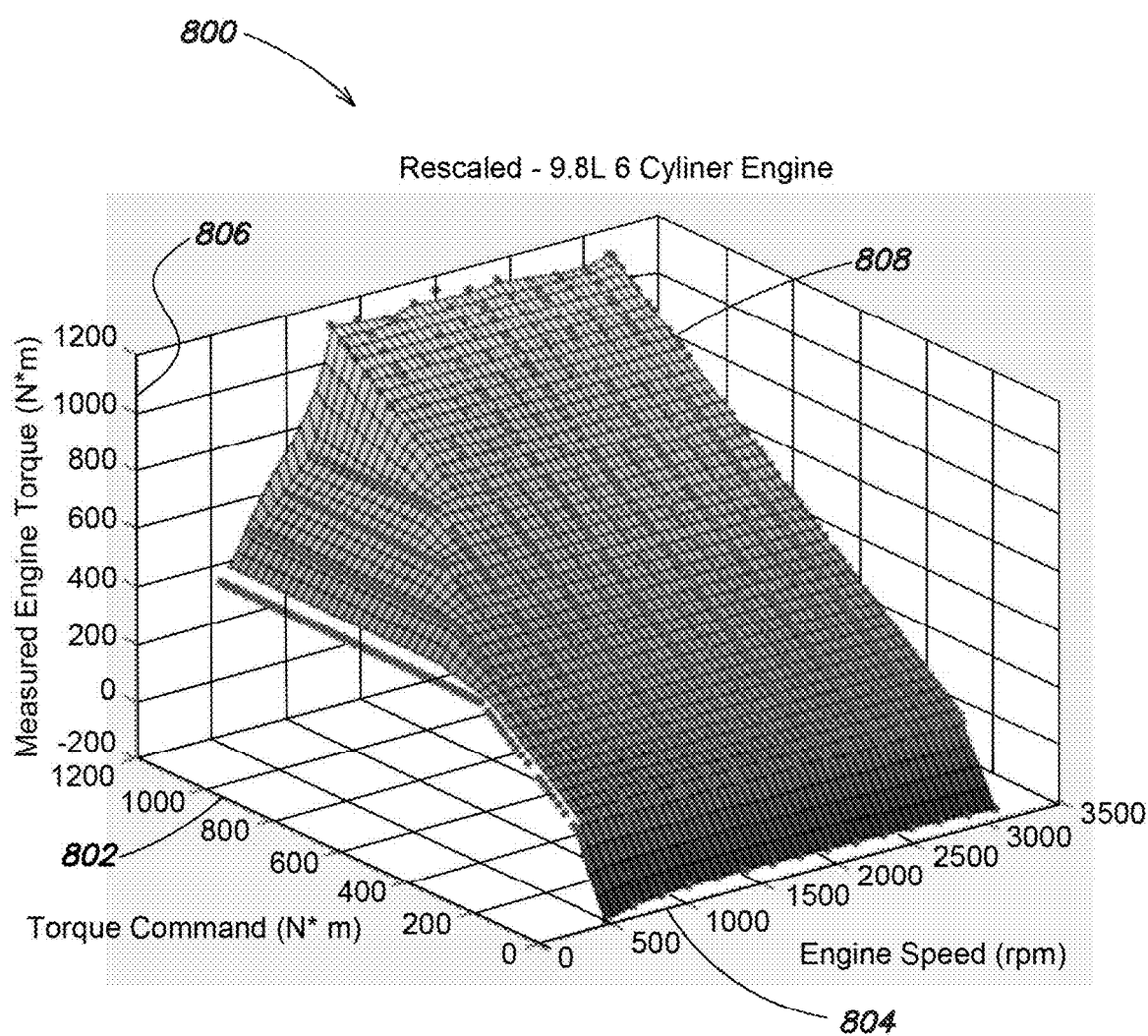
FIG. 8 is a schematic illustration of an example reshaped lookup table for use by rescaled engine model in accordance with an embodiment.

FIG. 8 is a schematic illustration of a rescaled lookup table 800 for obtaining engine brake torque as a function of engine speed and a torque command. The table 800 includes a torque command axis 802, an engine speed axis 804, and a measured engine torque axis 806. The table 800 further includes output data 808.

Figure 9:
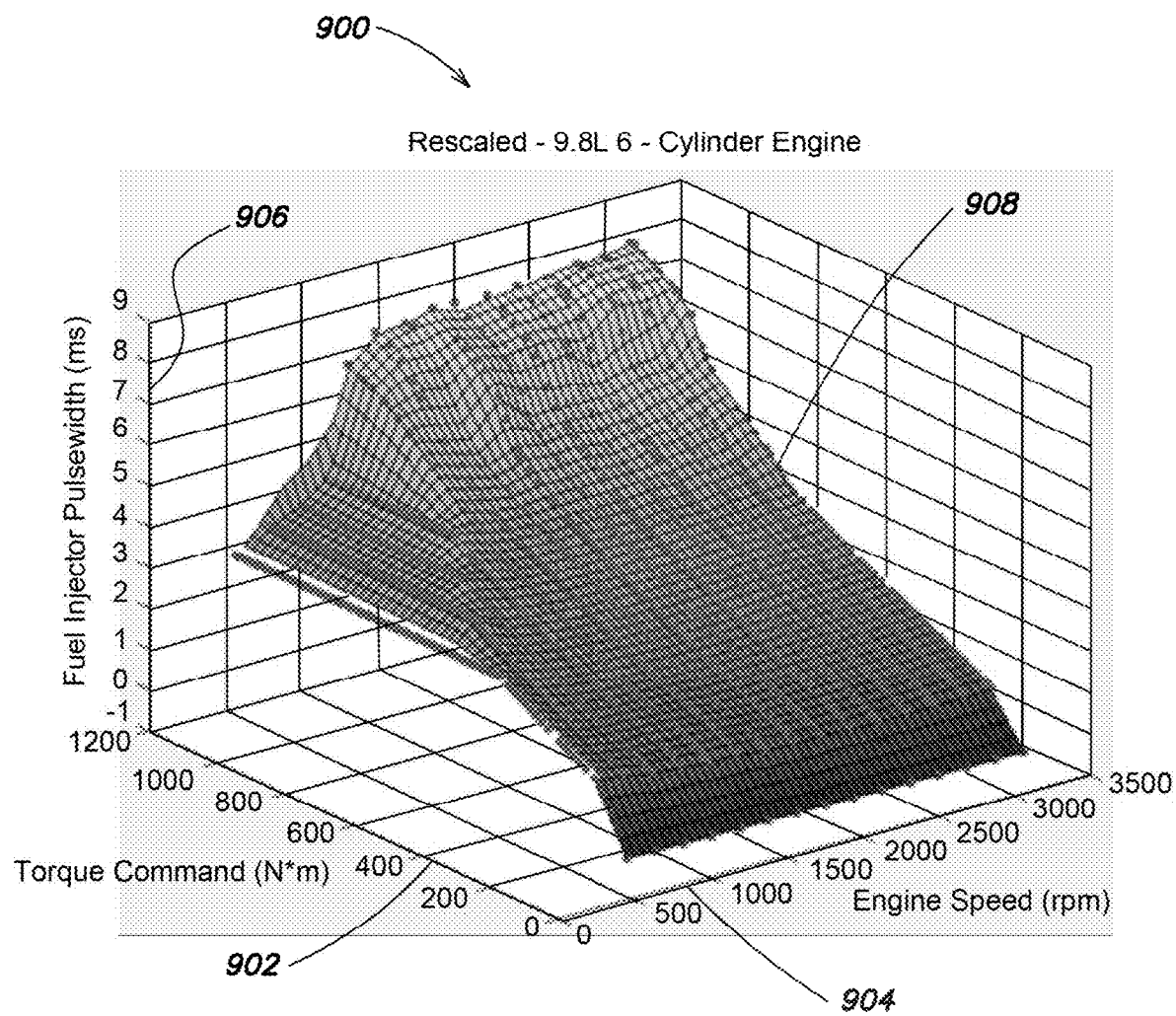
FIG. 9 is a schematic illustration of an example reshaped lookup table for use by a rescaled engine controller model in accordance with an embodiment.

FIG. 9 is a schematic illustration of an example of a rescaled lookup table 900 for obtaining a fuel injector pulsewidth and/or total fuel mass per inject per cylinder command for a fuel injector as a function of a torque command and engine speed. The table 900 includes a torque command axis 902, an engine speed axis 904, and a fuel injector pulsewidth axis or fuel mass per inject axis 906. The table 900 further includes output data 908.

The tables 800 and 900 may be rescaled versions of tables 500 and 600, respectively, for a larger size engine, e.g. a six cylinder 9.8 L engine, which may have four times the power of the original engine.

Comparing tables 500 and 800, it can be seen that engine speeds have been scaled down, e.g., due to the much larger stroke of the engine (note: while the bore/stroke ratio may be fixed, the stroke itself is much larger), and torque commands have been scaled up for the larger sized engine. Additionally, the output data, measured engine torque, is nonlinearly scaled up for the larger sized engine. For the larger sized engine, the location of peak torque is shifted with respect to engine speed in a nonlinear fashion with engine speed. Peak torque occurs at a much lower speed, as expected with large engines.

Regarding tables 900 and 600, injector slope (injector sizing) is different for the larger sized engine. Although there are more cylinders (6 vs. 4), which would normally mean smaller injectors, each individual cylinder of the larger sized 6 cylinder engine is much larger than a single cylinder of the original 1.5 L engine. Accordingly, the injector slope is larger for the new larger sized engine. For the larger sized engine, the injector pulsewidth (injector on-time) is not substantially different in scale from the original engine. This may be because the injectors themselves are increased in size to match the change in cylinder volume, so the on-time of the injectors of the small and large engines are relatively similar, although the location of large puslewidths (larger injected fuel masses) has shifted in engine speed.

Figure 10:
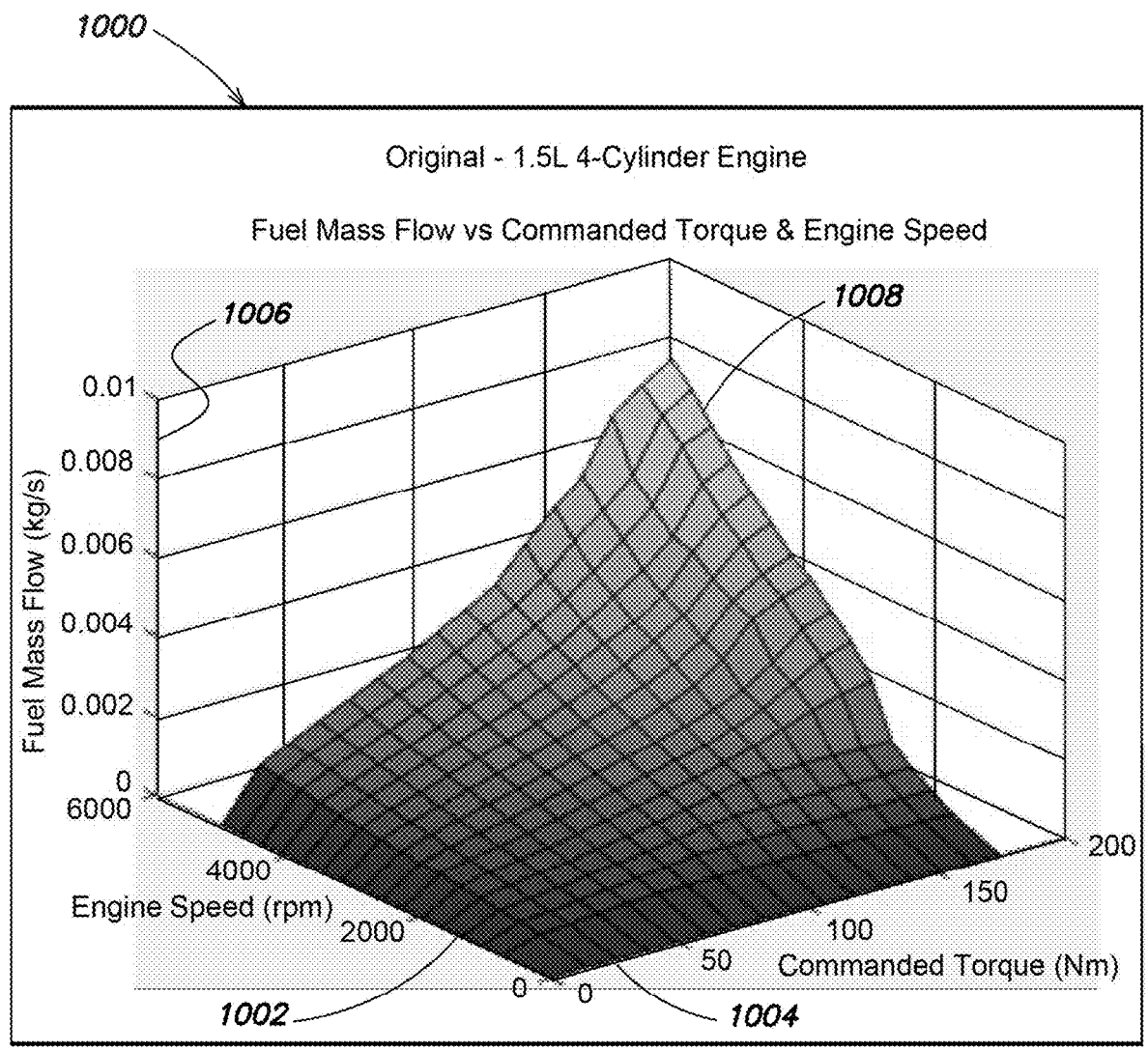
FIG. 10 is a schematic illustration of an example of an original lookup table in accordance with an embodiment.

FIG. 10 is a schematic illustration of an example of a lookup table 1000 for obtaining fuel mass flow for an original engine model that models a 1.5 L four-cylinder engine. The table 1000 includes an engine speed axis 1002, a commanded torque axis 1004, and a fuel mass flow axis 1006. The table 1000 further includes output data 1008.

Figure 11:
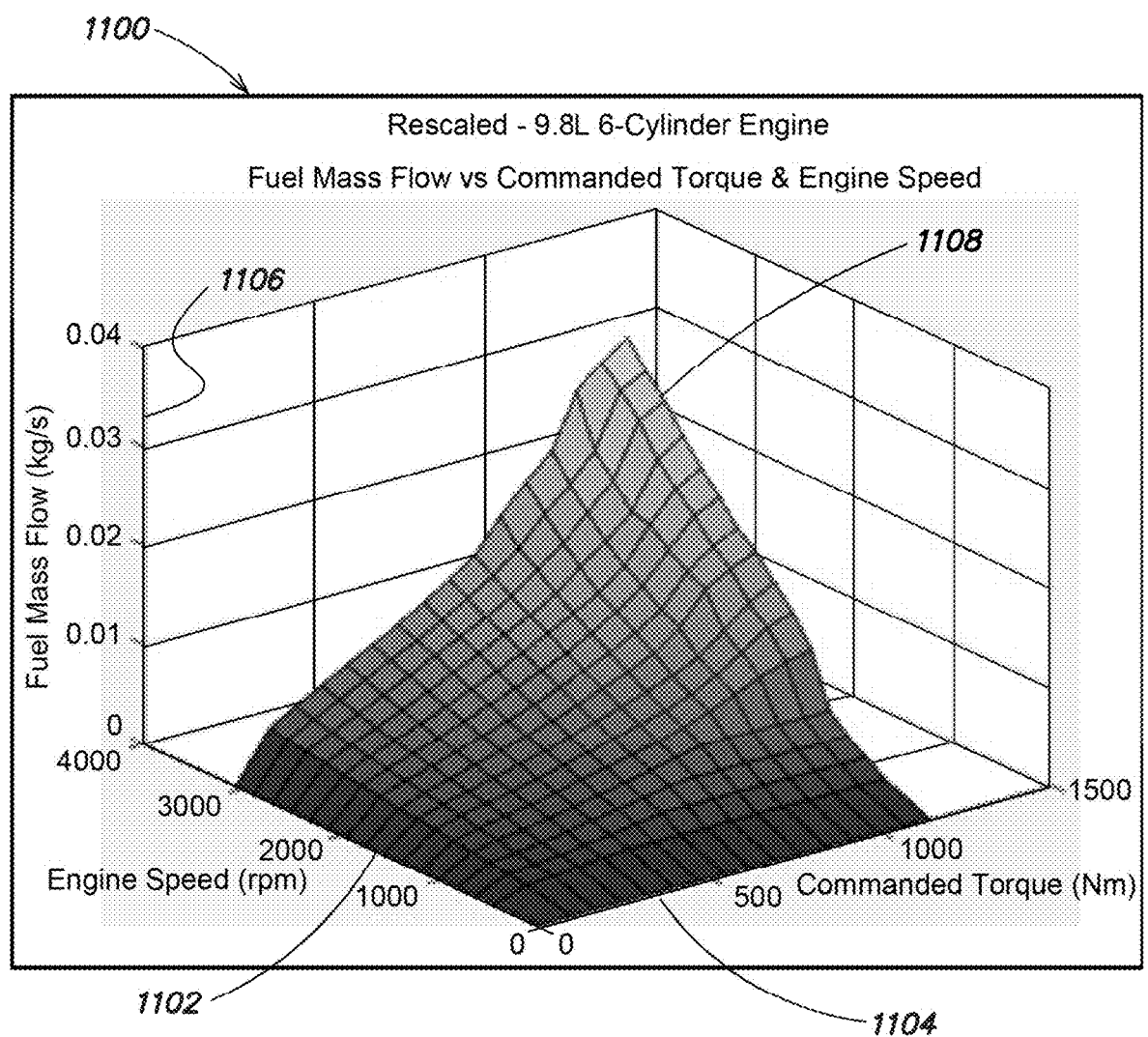
FIG. 11 is a schematic illustration of an example of a reshaped lookup table in accordance with an embodiment.

FIG. 11 is a schematic illustration of an example of a rescaled lookup table 1100 for obtaining fuel mass flow for a rescaled engine model that models a 9.8 L six-cylinder engine. The table 1100 includes an engine speed axis 1102, a commanded torque axis 1104, and a fuel mass flow axis 1106. The table 1100 further includes output data 1108.

It should be observed that the larger engine has dramatically larger torque breakpoints, and dramatically lower engine speed breakpoints than the smaller engine, and that the engine speed breakpoints move the peak torque to a new location in a nonlinear fashion.

In some embodiments, an engine model may generate emissions data during execution of the engine model. These emissions characteristics may be measured from a detailed emission model, or more preferably from an engine tested in a laboratory. The engine model may generate the emissions data based on data from one or more lookup tables and optionally with dynamically tuned estimators included in or accessible by the engine model. Exemplary emissions may include hydrocarbon (HC) mass fraction, carbon monoxide (CO) mass fraction, nitric oxide and nitrogen dioxide (NOx) mass fraction, and carbon dioxide ($CO_2$) mass fraction. Information in the emissions lookup tables may be based on test results obtained while running an actual, physical engine in a lab. The lookup table reshaping engine 228 may reshape the emissions tables when rescaling an engine model to represent a differently sized engine, thereby providing realistic empirically based emissions estimates for the re-sized engine without requiring a complete re-execution of testing in the laboratory or detailed engine emission model. The rescaled engine model created by the model rescaling tool 214 may thus predict new emission levels and locations of emission peaks and valleys in engine speed and torque operating point terms for the resized engine being modeled.

Figure 12:
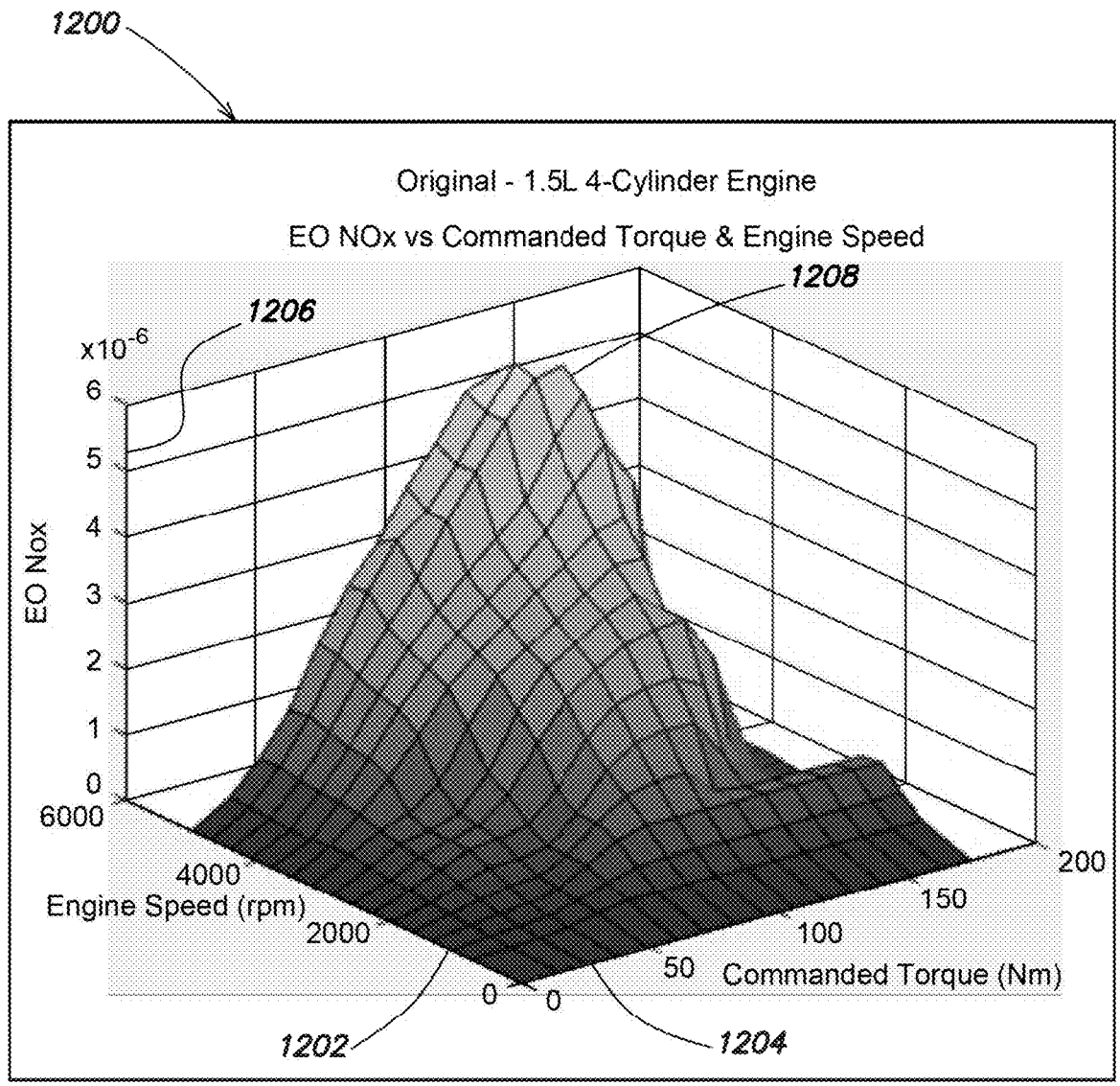
FIG. 12 is a schematic illustration of an example of an original lookup table in accordance with an embodiment.

FIG. 12 is a schematic illustration of an example of a lookup table 1200 for obtaining NOx mass fraction for an engine model that models a 1.5 L four cylinder engine. The table 1200 includes an engine speed axis 1202, a commanded torque axis 1204, and a NOx mass fraction axis 1206. The table 1200 also includes output data 1208.

Figure 13:
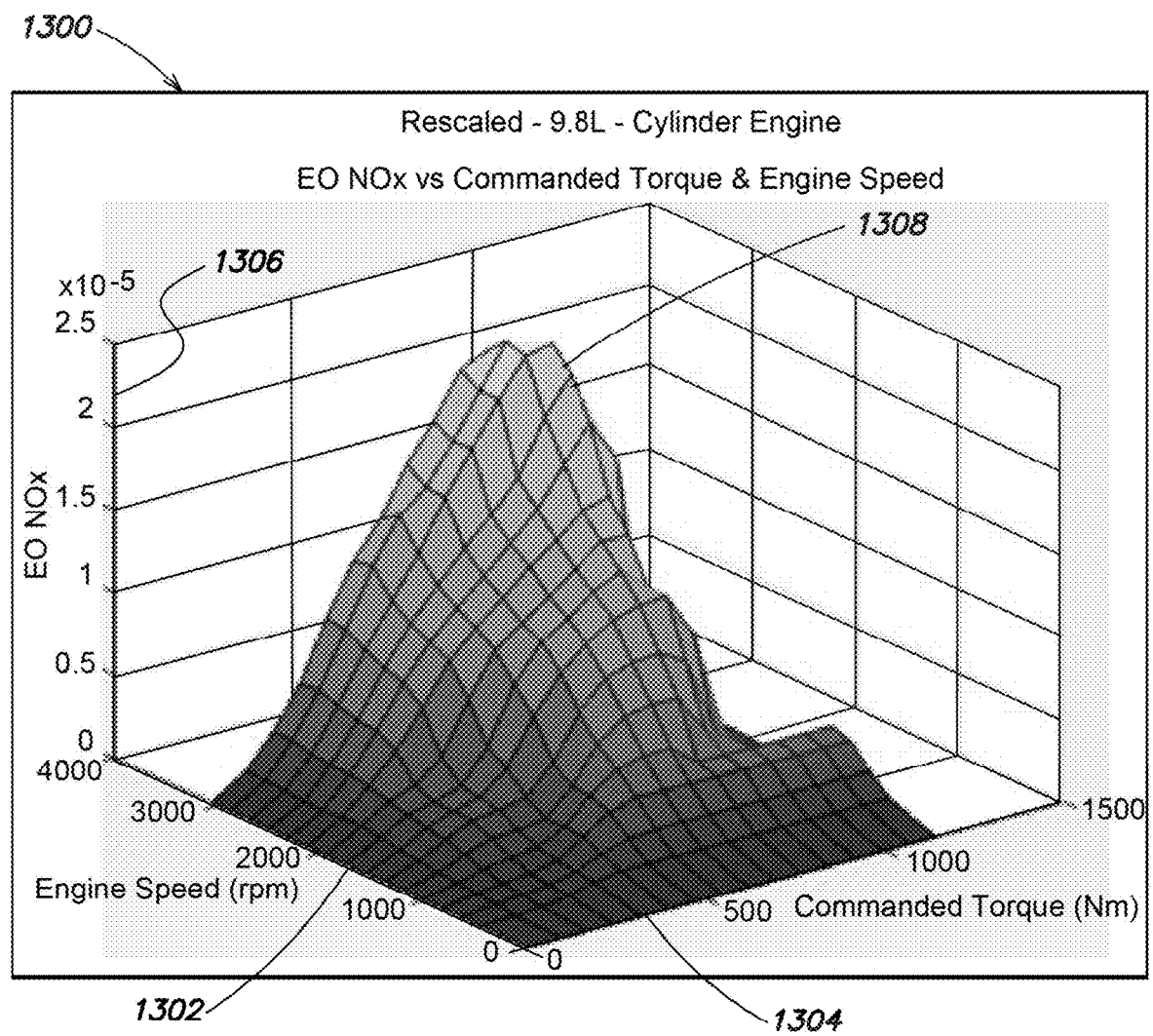
FIG. 13 is a schematic illustration of an example of a reshaped lookup table in accordance with an embodiment.

FIG. 13 is a schematic illustration of an example of a rescaled lookup table 1300 for obtaining NOx mass fraction for a rescaled engine model that models a 9.8 L six cylinder engine. The table 1300 an engine speed axis 1302, a commanded torque axis 1304, and a NOx mass fraction axis 1306. The table 1300 also includes output data 1308. As with fuel flow after re-scale, it should be noted that the relationships between emission response features such as peaks and troughs are shifted with respect to engine speed in a non-linear fashion. Since emission mass fractions are involved as opposed to absolute emissions, there is no need to scale the emission mass fractions with engine power ratio and engine breathing.

Returning to FIG. 7D, the model rescaling tool 214 may store the rescaled engine model parameters, rescaled engine controller model parameters, and/or the reshaped lookup tables in one or more data structures, as indicated at step 736. For example, the model rescaling tool 214 may store the parameters and lookup tables in a container file or object, such as a configuration set object. Configuration set objects may contain information specifying one or more parameters, attributes or properties of a model. Multiple configuration set objects may be defined for a particular model, and each configuration set object may contain different values for the model's parameters, attributes, or properties. A given one of the configuration set objects may be selected for use during execution of the model. The values included in the given configuration set object may be used to set corresponding model parameters, attributes, or properties before or during execution of the model.

In some embodiments, the modeling environment 200 may establish one or more model workspaces, masked workspaces, or data dictionary files for a model opened by the model editor 204 and/or loaded from persistent memory into main memory. Variables utilized during execution of the model may be stored in the one or more model workspaces. For example, model element parameters may be saved as workspace variables in the one or more model workspaces. The modeling environment 200 may utilize the configuration set object containing rescaled parameters and reshaped lookup tables to initialize a model workspace for the rescaled engine controller model and the rescaled engine model.

In some embodiments, the model rescaling tool 214 and/or the UI engine 202 may output or present parameters of the original engine controller model and the original engine model, as indicated at step 738. The model rescaling tool 214 also may output or present rescaled parameters of the rescaled engine controller model and the rescaled engine model, as indicated at step 740. A user may examine the presented parameters for comparison or other purposes.

Figure 14:
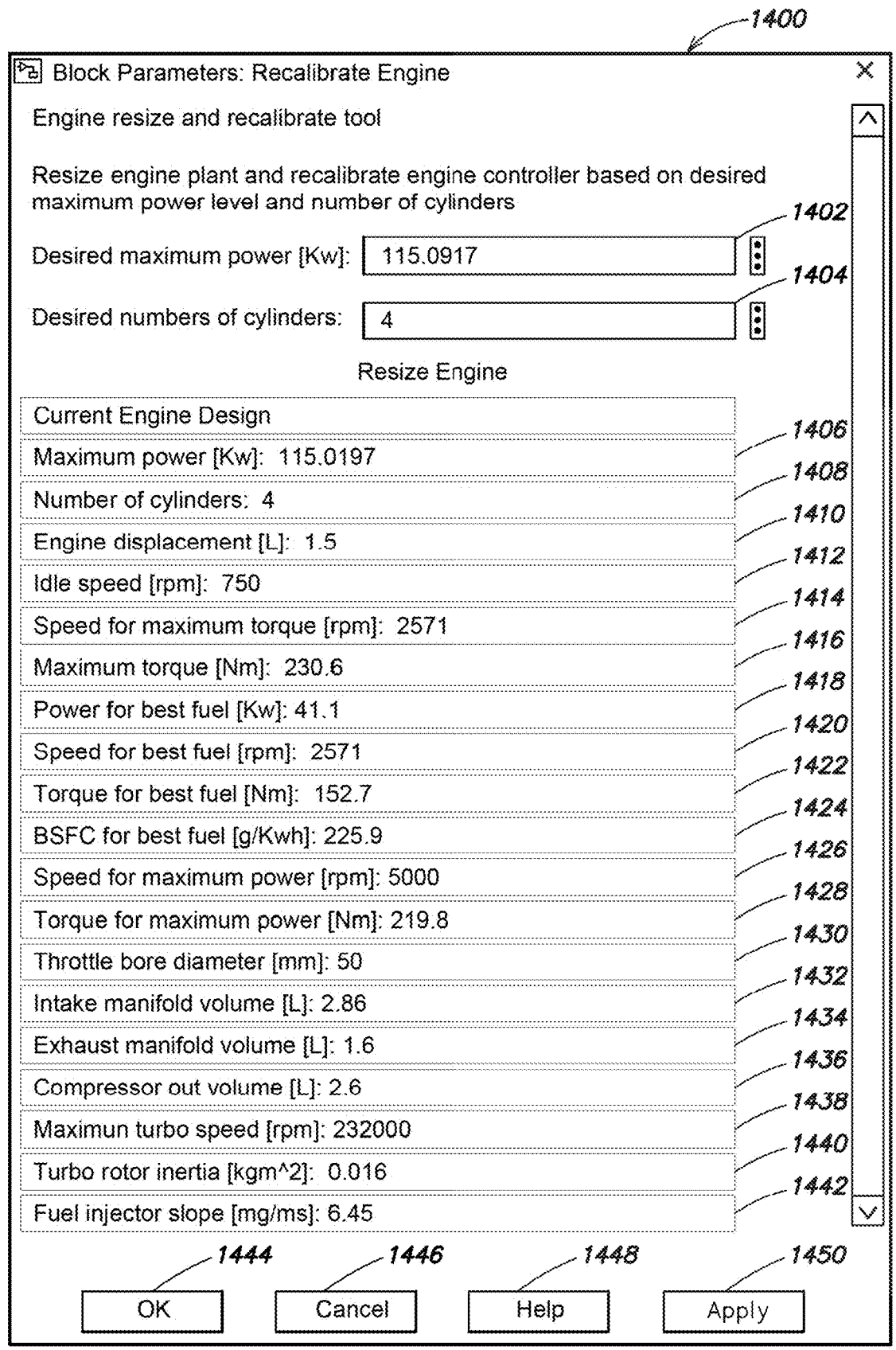
FIG. 14 is a schematic illustration of an example of a User Interface in accordance with an embodiment.

FIG. 14 is a schematic illustration of an example User Interface (UI) 1400 for receiving rescaling factors and presenting original engine controller model and engine model parameters in accordance with an embodiment. The UI 1400 may include a plurality of controls or widgets for receiving and/or displaying data. For example, the UI 1400 may include a Desired maximum power control 1402 and a Desired number of cylinders control 1404. The values presented in the Desired maximum power control 1402 and a Desired number of cylinders control 1404 may correspond to the rescaling factors and may be user editable. As illustrated, for the original engine model, the Desired maximum power is 115.0917 Kw, and the Desired number of cylinders is 4. The UI 1400 may include other controls that present at least some of the parameters associated with the engine model and/or engine control model. For example, the UI 1400 may include a Maximum power control 1406, a Number of cylinders control 1408, an Engine displacement control 1410, an Idle speed control 1412, a Speed for maximum torque control 1414, a Maximum torque control 1416, a Power for best fuel control 1418, a Speed for best fuel control 1420, a Torque for best fuel control 1422, a brake specific fuel consumption (BSFC) for best fuel control 1424, a Speed for maximum power control 1426, a Torque for maximum power control 1428, a Throttle bore diameter control 1430, an Intake manifold volume control 1432, an Exhaust manifold volume control 1434, a Compressor out volume control 1436, a Maximum turbo speed control 1438, a Turbo rotor inertia control 1440, and a Fuel injector slope control 1442. It should be understood that the list of controls is exemplary only, and that other values for additional and/or other parameters may be presented.

The UI 1400 may also include one or more command buttons, such as an OK button 1444, a Cancel button 1446, a Help button 1448, and an Apply button 1450.

In some embodiments, after entering values for the rescaling factors, e.g., Desired maximum power and Desired number of cylinders, a user may select the Apply button 1450. In response, the model rescaling tool 214 may generate a rescaled engine model and a matching rescaled engine controller model.

Figure 15:
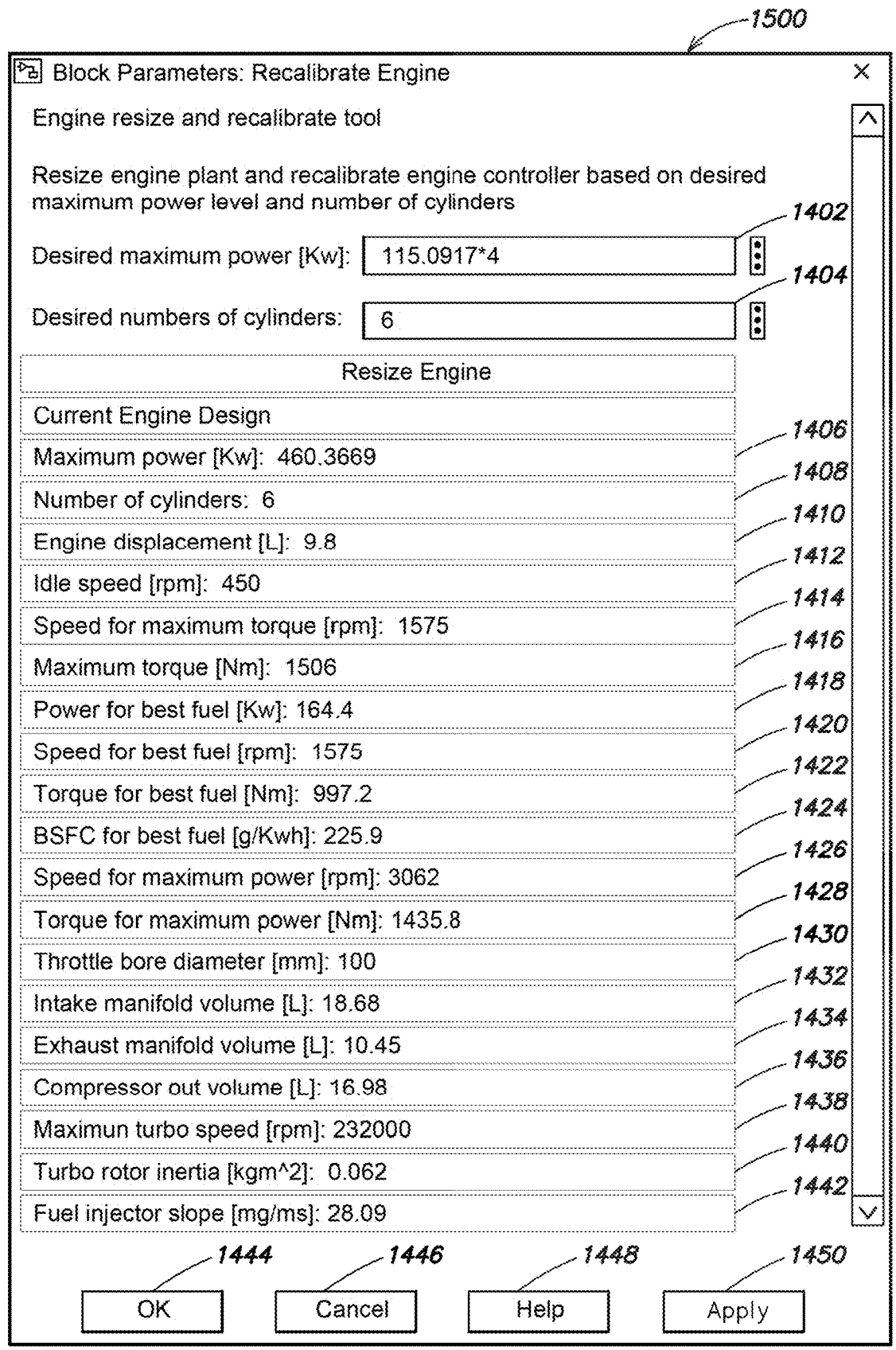
FIG. 15 is a schematic illustration of an example of another User Interface in accordance with an embodiment.

FIG. 15 is a schematic illustration of an example User Interface 1500 presenting the received rescaling factors and the rescaled engine controller model and engine model parameters. For the resized engine, the user has entered 115.0917*4 in the Desired maximum power control 1402, e.g., a fourfold increase in the original engines maximum power. In the Desired number of cylinders control 1404, the user has entered 6. In the remaining controls of the UI 1400 are presented the respective rescaled parameters. As indicated in the Idle speed control 1412, increasing the size of the engine results in the engine's idle speed dropping from 750 rpm to 459 rpm.

As alternatives to rescaling operations defined solely by changes to engine power and number of cylinders, any other combination of parameters that yield unique re-size characteristics can be chosen by the user. For example, the user could be given the option to specify re-sized engine displacement volume Vd in place of engine power, and location of minimum BSFC in engine speed in place of number of cylinders, leaving re-sized engine power and re-sized engine number of cylinders as free variables.

It should be understood that the rescaling of the original model of a four cylinder 1.5 L engine to a model of a six cylinder 9.8 L engine having four times the power as the original engine described herein is just one example. The model rescaling tool 214 may rescale an original model of an engine, such as the four cylinder 1.5 L engine, to models of other larger size engines or to models of smaller size engines, such as a one cylinder 0.15 L engine.

Returning to FIG. 7D, in some embodiments, the rescaled engine controller model and the rescaled engine model may be executed, as indicated at step 742. For example, the rescaled engine controller model and the rescaled engine plant model may be included in and thus executed as part of a system model.

The simulation engine 212 may execute the system model including the rescaled engine controller model and the rescaled engine plant model. For example, a user may select a Run command button of a command toolbar presented by the UI engine 202 in a model editor window. Alternatively, a user may enter a text-based command in a CLI. A model, such as the system model, may also be executed programmatically. In some embodiments, model execution may include a compile stage, a link stage, and a simulation loop stage. The compile and link stages may be performed by the model compiler 220 of the simulation engine 212. The compile stage may mark the start of execution of the model, and may involve preparing data structures and evaluating parameters, configuring and propagating model element characteristics (e.g., sample times, data types, etc.), determining model element connectivity, performing model element reduction and model element insertion, and generating a sorted order of the equations corresponding to the model elements of the model. Model element reduction may include collapsing and/or reducing one or more groups of model elements. For example, model elements or signals determined to be in an unused code path, e.g., dead code, rate transition model elements whose input frequency is faster than their output frequency, and type conversion blocks determined to be unnecessary may be collapsed or removed.

The preparation of data structures and the evaluation of parameters may create and initialize one or more data structures used in the compile stage. For each model element, a method may force the model element to evaluate all of its parameters. During the configuration and propagation of model element and port/signal characteristics, the compiled attributes (such as data dimensions, data types, complexity, sample modes, and sample time) of each model element (and/or ports) may be setup on the basis of the corresponding behaviors and the attributes of model elements (and/or ports) that are connected to the given model element through lines, e.g., arrows. Attributes may also be setup based on the context of a model element or a component in a model. For example, a subsystem, which may be a group of model elements hierarchically represented as a single model element, that has a given sample time may have this sample time be set to the sample time of model elements included in the subsystem.

The attribute setup may be performed through a process during which model element behaviors "ripple through" the model from one model element to the next following signal or other connectivity, as well as through the hierarchical structure of the model, and may for example follow connectivity in a forward or backward manner. This process is referred to as "propagation." In the case of a model element that has explicitly specified its model element behaviors or the behaviors of its ports, propagation may help ensure that the attributes of the model element are compatible with the attributes of the model elements connected to it or contained by it. If not, an error may be issued. At least some model elements may be implemented to be compatible with a wide range of attributes. Such model elements may adapt their behavior in accordance with the attributes of the model elements connected to them. The exact implementation of the model element may be chosen on the basis of the model in which the model element is located. Included within this step are other aspects such as validating that all rate-transitions yield deterministic results, and that the appropriate rate transition blocks are being used.

The compilation step also may determine model element connectivity. For example, a model may include one or more virtual blocks that may play no semantic role in the execution of the model. In this step, the virtual blocks may be optimized away, e.g., removed, and the remaining non-virtual model elements may be reconnected to each other appropriately. This compiled version of the model with actual model element connections may be used from this point forward in the execution process.

One or more in memory representations, such as intermediate representations (IRs), may be generated for the model by the IR builder 224. At least one of the IRs may be in the form of a directed graph, such as a hierarchical, Data Flow Graph (DFG) having a plurality of nodes interconnected by edges. The nodes of the IR may represent model elements from the executable graphical model, the edges of the IR may represent connections among the model's model elements. Special nodes of the IR may be used to provide hierarchy in the IR, for example, by abstractly representing subsystems or other components of the model. In some implementations, model elements of the model may map to one or more nodes of the IR, and lines or arrows of the model may map to one or more edges of the IR.

It should be understood that an IR may take other forms, such as a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as the main memory or a persistent memory of a data processing device.

Following the compilation stage, code may or may not be generated for the model. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the desired time-span. When users generate code for a model, they may choose to not proceed further with the model's execution. For example, they may choose to take the generated code and deploy it outside of the confines of the modeling environment 200.

The link stage may involve memory allocation, and generation of a block method execution list from the sorted order. During the simulation loop stage, the compiled and linked version of the model may be directly utilized by the simulation engine 212 to execute the model in an interpreted mode. The way in which the input and output of model elements are interconnected in the model does not necessarily define the order in which the equations (methods) corresponding to the individual model elements will be solved (executed). The actual order may be determined during the sorting step in compilation.

Figure 7A:
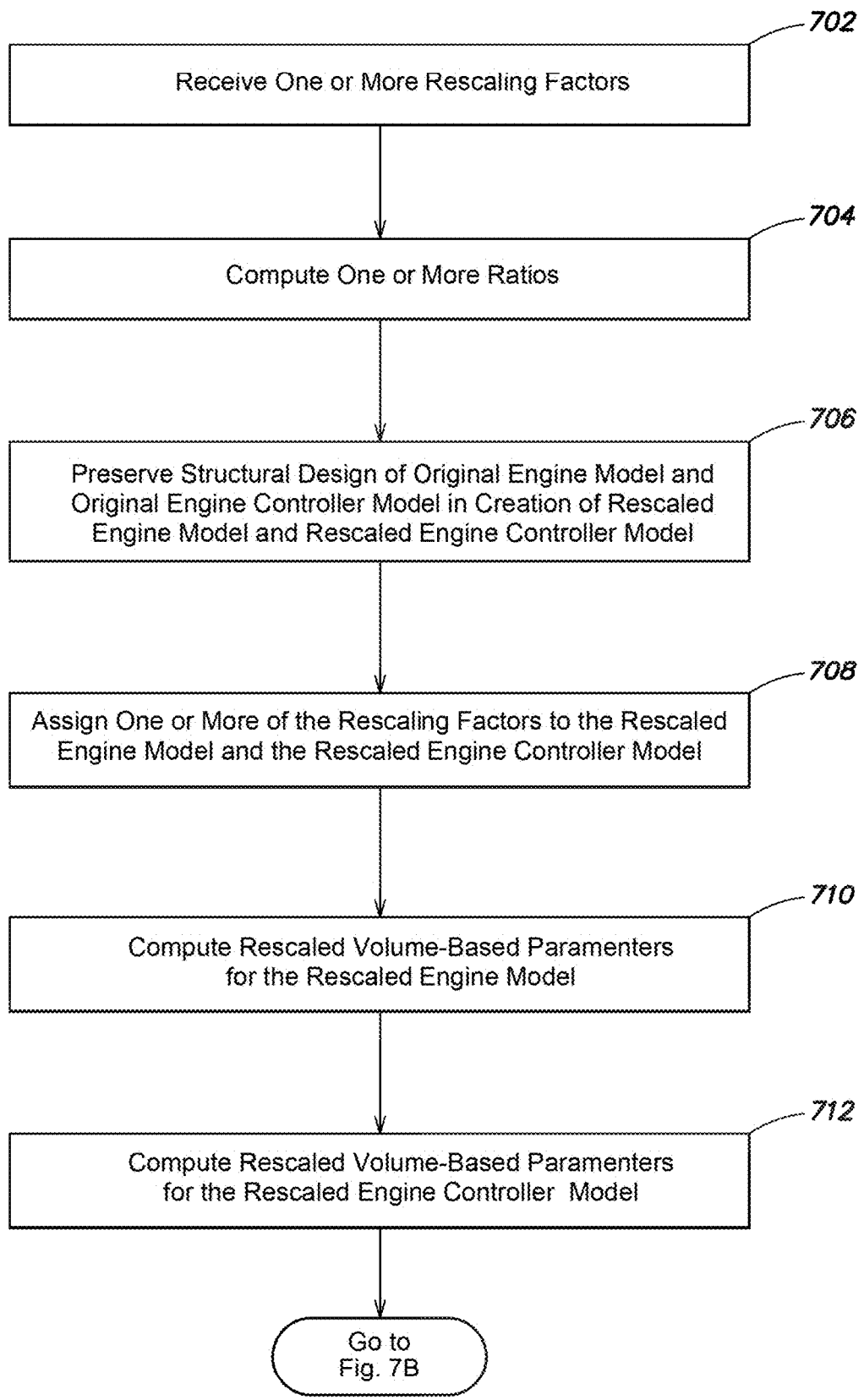
FIGS. 7A-E are partial views of a flow diagram of an example method in accordance with an embodiment.
Figure 7B:
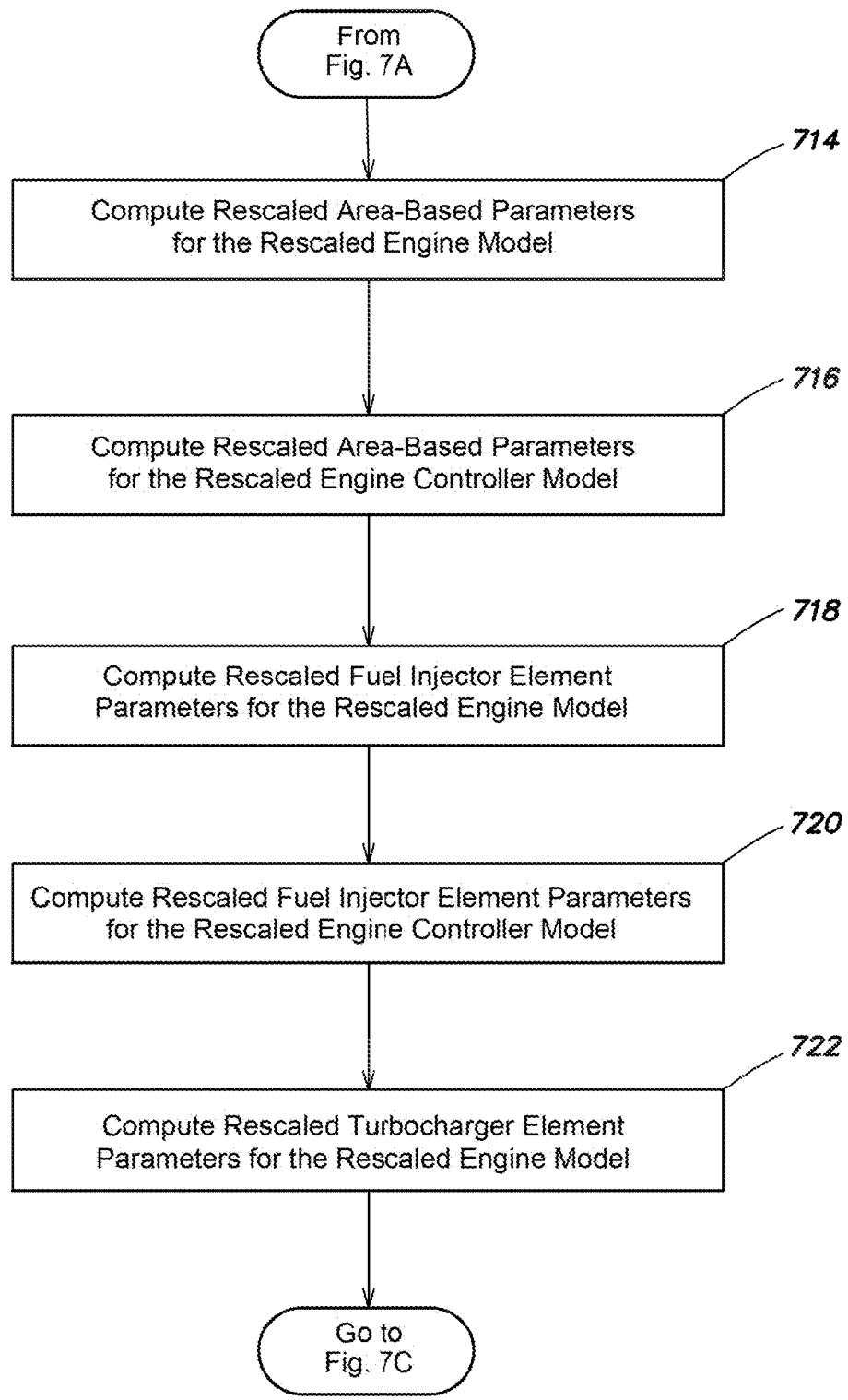
Figure 7C:
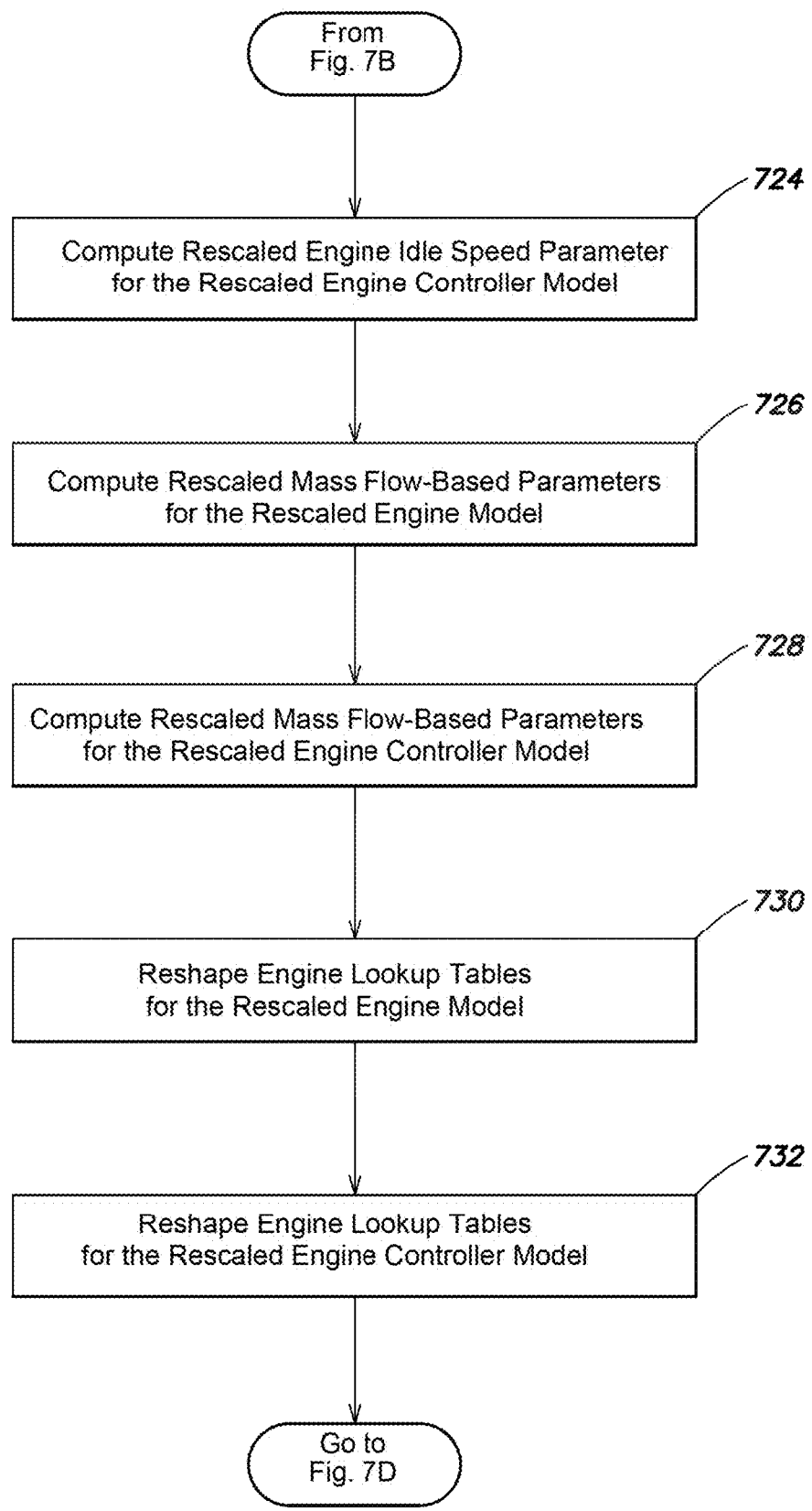
Figure 7D:
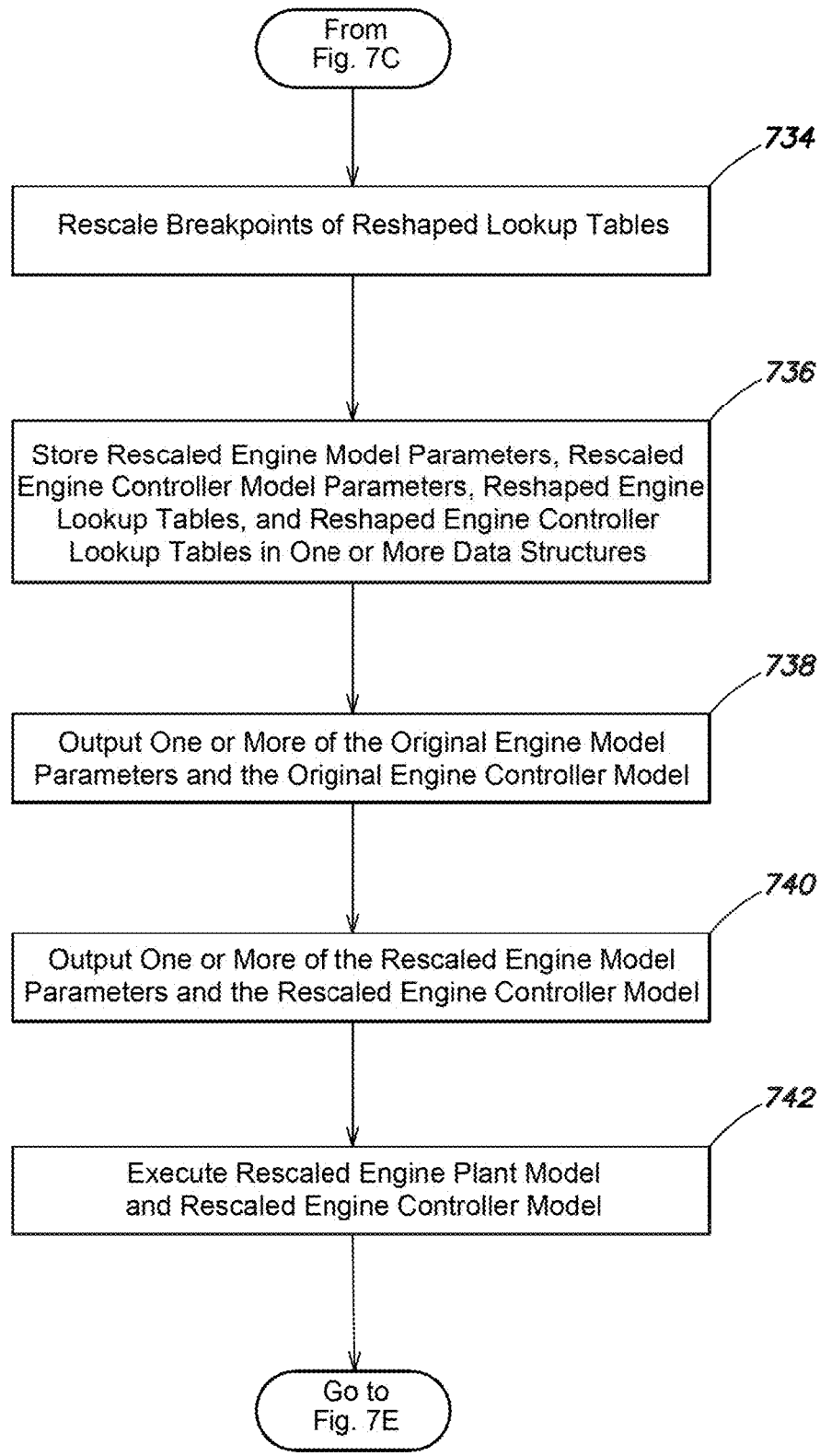
Figure 7E:
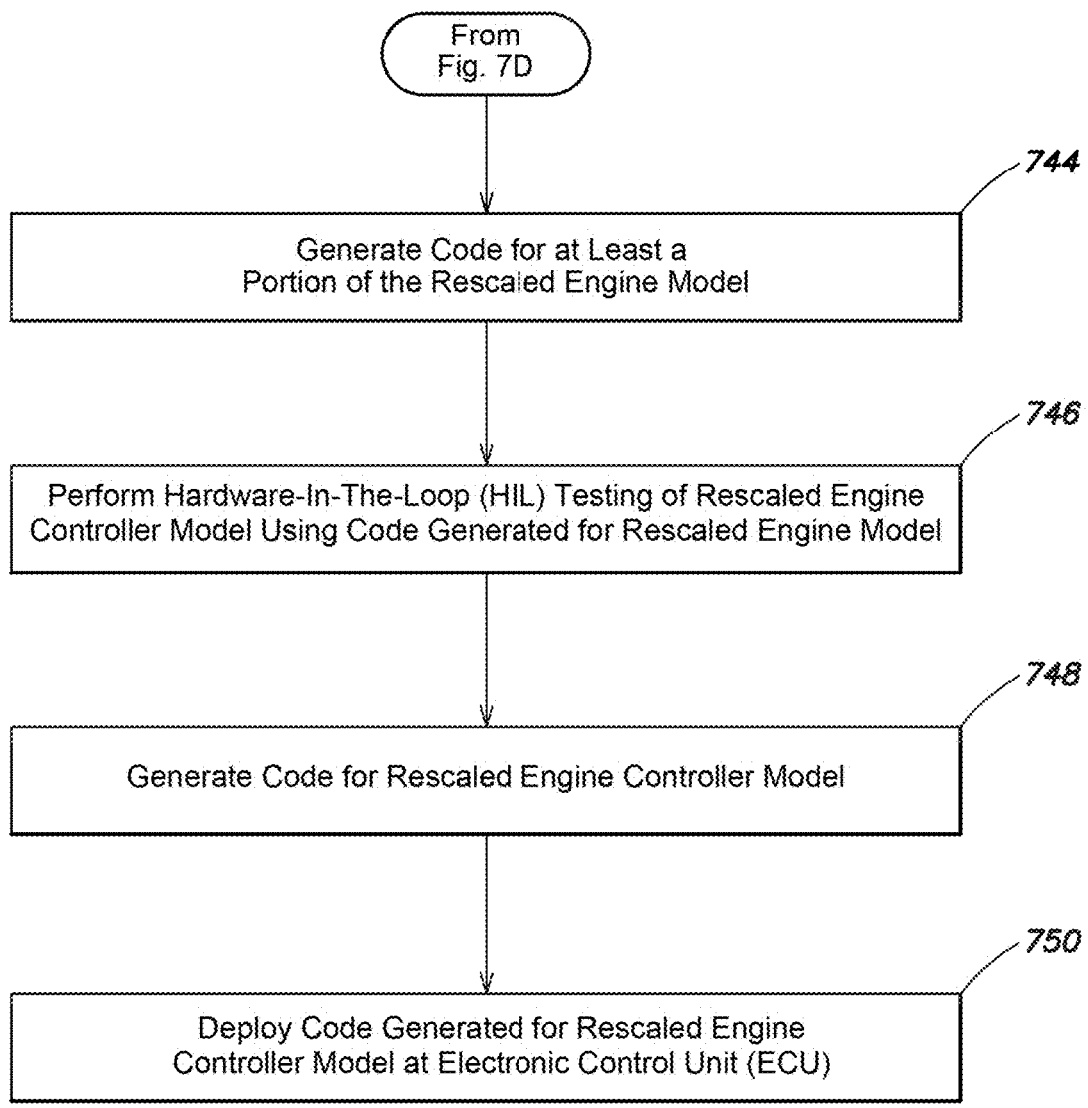

Alternatively or additionally to model execution, the code generator 208 may generate code for at least a portion of the rescaled engine model, as indicated at step 744 (FIG. 7E). The generated code for the rescaled engine model may be utilized in Hardware-in-the-Loop (HIL) testing of the rescaled engine controller model, as indicated at step 746. Alternatively or additionally to model execution and/or HIL testing, the code generator 208 may generate code for the rescaled engine controller model, as indicated at step 748. The generated code for the rescaled engine controller model may be deployed as embedded software on an electronic control unit (ECU), as indicated at step 750.

Iterative Search

In some embodiments, the model rescaling tool 214 may perform an iterative search within a parameter space. For example, instead of specifying maximum engine power as a rescaling factor, a user may specify throttle bore diameter at the Throttle bore diameter control 1430. The model rescaling tool 214 may generate a rescaled engine controller model and a rescaled engine model based on these rescaling factors. Any combination of mutually exclusive parameters as dictated by the constraining relations and assumptions of engine physics can be designated by the user as free variables, with the remaining parameters as a combination of derived or fixed variables. The derived variables (e.g. BSFC and location of minimum BSFC) can be arrived at directly where possible, or iteratively using heuristic and/or mathematical engine rescaling engine solvers.

Generation of Static Engine Model

In some embodiments, the static engine model constructor 230 may create a static rescaled engine model using data generated during testing of the rescaled engine controller model and the rescaled engine model. Additionally a third party detailed dynamic engine model can be used as a testing source from which to create a static rescaled engine model equivalent in an automated labor-saving fashion.

Figure 16A:
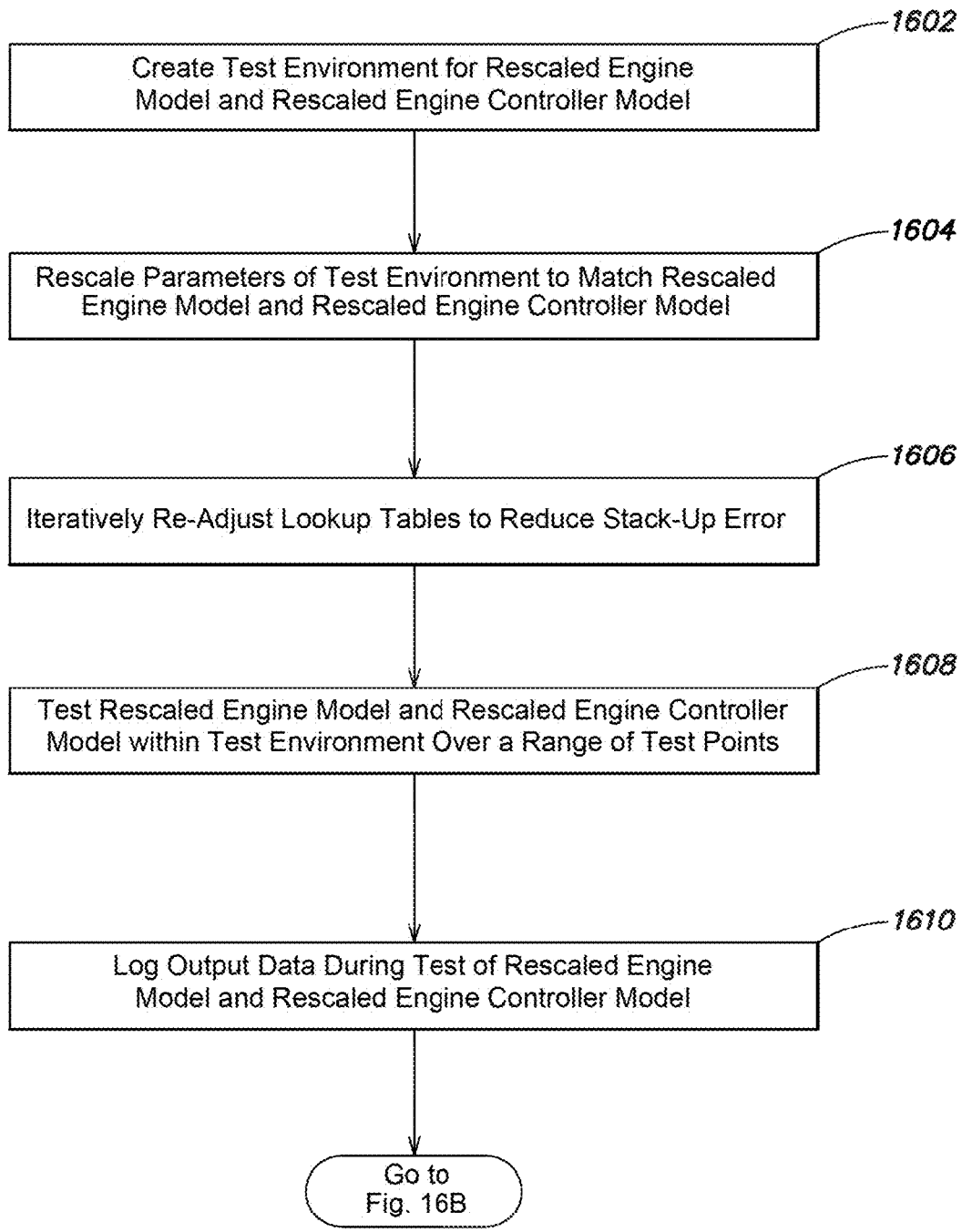
FIGS. 16A and 16b are partial views of a flow diagram of an example method in accordance with an embodiment.
Figure 16B:
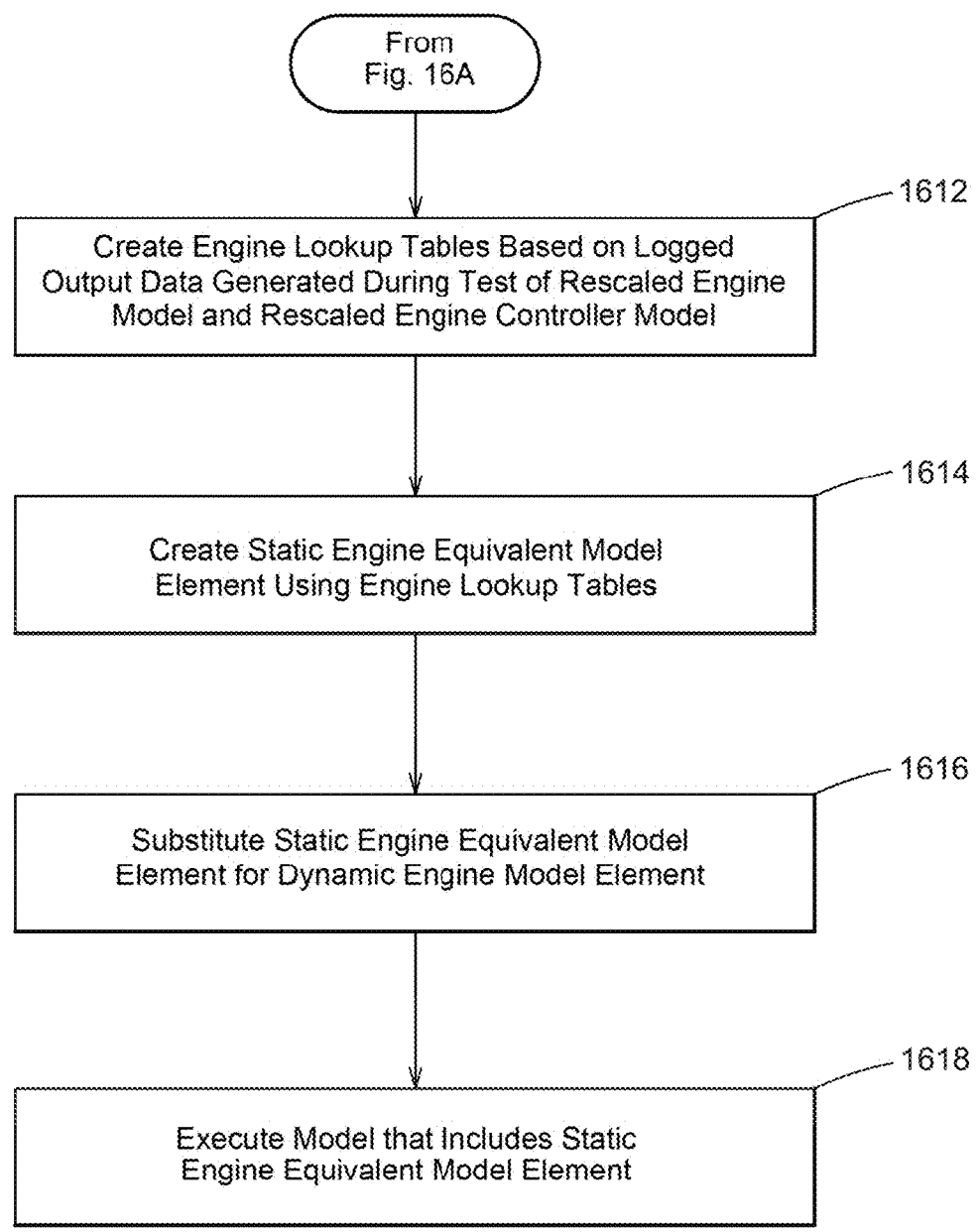

FIGS. 16A and 16B are partial views of a flow diagram of an example method in accordance with an embodiment. The modeling environment 200 may include the rescaled engine controller model and the rescaled engine model in a test environment, as indicated at step 1602. For example, the modeling environment 200 may include the rescaled engine controller model and the rescaled engine model in a dynamometer model.

Figure 17:
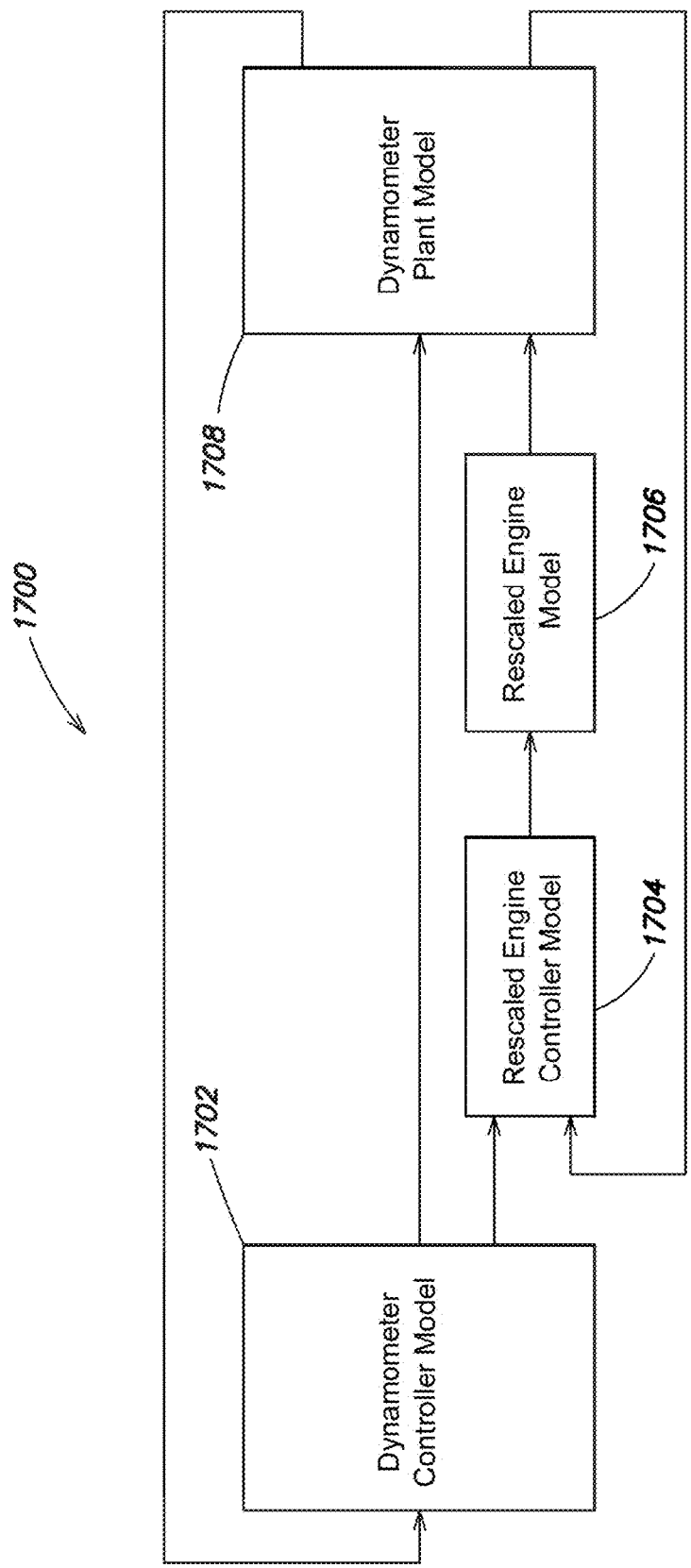
FIG. 17 is a schematic illustration of an example dynamometer model in accordance with an embodiment.

FIG. 17 is a schematic illustration of an example dynamometer system model 1700 for testing the rescaled engine controller model and the rescaled engine model in accordance with an embodiment. The dynamometer system model 1700 may include a dynamometer controller model 1702, a rescaled engine controller model 1704, a rescaled engine model 1706, and a dynamometer plant model 1708. Suitable dynamometer system models include the SI and CI Engine Dynamometer Reference Applications from The MathWorks, Inc.

In some embodiments, an original dynamometer model may have been created for the original engine controller model and the original engine model. The model rescaling tool 214 may reuse this dynamometer model. The model rescaling tool 214 may rescale one or more parameters of the dynamometer model to match the size of the rescaled engine controller and engine models using the one or more computed ratios, as indicated at step 1604. For example, the model rescaling tool may rescale the testing range in torque and speed to reflect the new engine size. For example, the dynamometer controller model may include a plurality of original engine speed command points for testing an engine controller model and engine model. The model rescaling tool 214 may generate rescaled engine speed command points as follows:

rescaled engine speed command points=original engine speed command points*EngSpdRatio.

The dynamometer controller model also may include a plurality of original engine torque command points. The model rescaling tool 214 may generate rescaled engine torque command points as follows:

rescaled engine torque command points=original engine torque command points*EngTrqRatio.

The dynamometer plant model may include parameters, such motor size parameters, inertia parameters, power absorption parameters, heat rejection capacity parameters, etc. These additional parameters may also be rescaled.

In some embodiments, one or more lookup tables may be iteratively re-adjusted to reduce stack-up errors that may occur, as indicated at step 1606. The iterative re-adjusting may be performed on a limited subset of parameters and/or lookup tables, such as parameters used to take up the slack between measured torque and commanded torque. For example, throttle and wastegate engine controller calibration tables may be re-adjusted iteratively using the Stateflow state chart tool to reduce and/or remove stack-up error that may arise due to the re-scaling of the engine plant model calibration tables. The stack-up error may include the difference between commanded engine torque and actual engine torque.

With the dynamometer model rescaled to match the rescaled engine controller and engine models, the rescaled dynamometer model may be run to test the rescaled engine controller and engine models at a plurality of test points, as indicated at step 1608. At step 1608, the final engine performance may be evaluated the after the re-scale operation of step 1604 and the re-adjust or retuning to remove stack-up error in step 1606. During testing of the rescaled engine controller and engine models, the static engine model constructor 215 may store, e.g., log, engine output data, as indicated at step 1610. The static engine model constructor 215 may create a set of lookup tables based on the engine output data obtained during testing of the rescaled engine controller and engine models, as indicated at step 1612. The set of lookup tables, which may contain sufficient data to model the performance behavior of the rescaled engine model, also may be associated with a static engine equivalent model element, as indicated at step 1614.

In some embodiments, a static engine equivalent model element may be parameterized directly using data obtained during testing of a sophisticated engine model, such as a GTSUITE engine model, a WAVE or WAVE RT model, or an AVL Boost model, in a simulation environment.

As described, the original engine model and the rescaled engine model may be dynamic models that perform operations or functions during execution to compute engine output data. During simulation of a dynamic model, differential equations may be generated and solved. In contrast, the static engine equivalent model element may not be a dynamic model. Instead, the static engine equivalent model element may determine engine output data based entirely on the information included in its set of lookup tables. The modeling environment 200 may substitute the static engine equivalent model element for the rescaled engine model, as indicated at step 1616. For example, the modeling environment 200 may delete the rescaled engine model from the system model, and connect the rescaled engine controller model to the static engine equivalent model element. The modeling environment 200 may run the system model that includes the static engine equivalent model element, as indicated at step 1618.

Because it consists principally of lookup tables, the static engine equivalent model element may execute faster than the rescaled engine model and may require less memory space than the rescaled engine model.

Exemplary Data Processing Device

Figure 18:
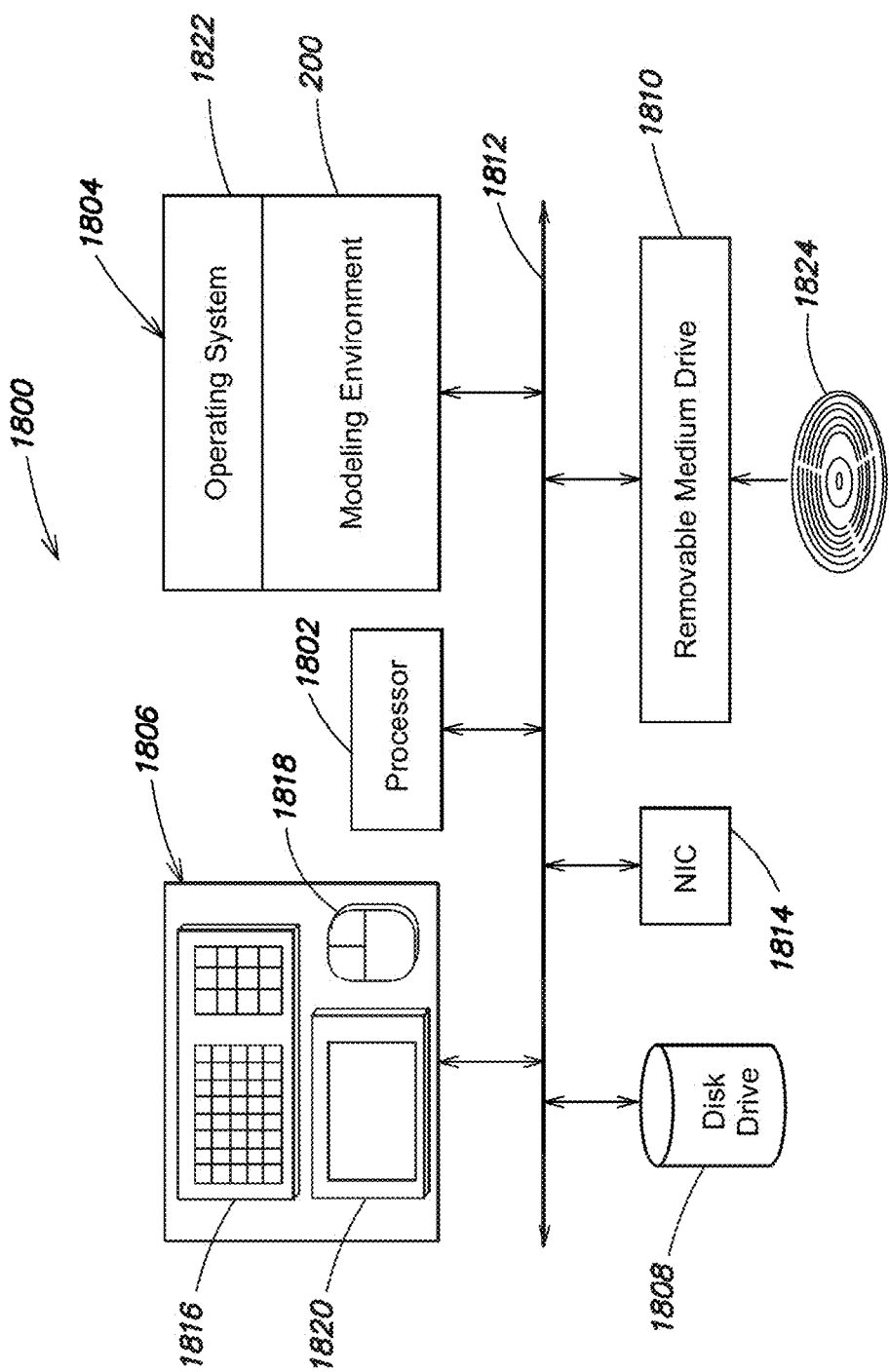
FIG. 18 is a schematic illustration of an example of a data processing system in accordance with an embodiment.

FIG. 18 is a schematic illustration of a computer or data processing system 1800 for implementing an embodiment of the invention. The computer system 1800 may include one or more processing elements, such as a processor 1802, a main memory 1804, user input/output (I/O) 1806, a persistent data storage unit, such as a disk drive 1808, and a removable medium drive 1810 that are interconnected by a system bus 1812. The computer system 1800 may also include a communication unit, such as a network interface card (NIC) 1814. The user I/O 1806 may include a keyboard 1816, a pointing device, such as a mouse 1818, and a display 1820. Other user I/O 1806 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1804, which may be a Random Access Memory (RAM), may store a plurality of program libraries or modules, such as an operating system 1822, and one or more application programs that interface to the operating system 1822, such as the modeling environment 200.

The removable medium drive 1810 may accept and read a computer readable medium 1824, such as a CD, DVD, floppy disk, solid state drive, tape, flash memory or other non-transitory medium. The removable medium drive 1810 may also write to the computer readable medium 1824.

Suitable computer systems include personal computers (PCs), workstations, servers, laptops, tablets, palm computers, smart phones, electronic readers, and other portable computing devices, etc. Nonetheless, those skilled in the art will understand that the computer system 1800 of FIG. 18 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 1800 may be hosted on one or more cloud servers or devices, and accessed by remote clients through a web portal or an application hosting system, such as the Remote Desktop Connection tool from Microsoft Corp.

Suitable operating systems 1822 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1822 may provide services or functions for applications or modules, such as allocating memory, organizing data objects or files according to a file system, prioritizing requests, managing I/O, etc. The operating system 1822 may run on a virtual machine, which may be provided by the data processing system 1800.

As indicated above, a user, such as an engineer, scientist, programmer, developer, etc., may utilize one or more input devices, such as the keyboard 1816, the mouse 1818, and the display 1820 to operate the modeling environment 200, including the model rescaling tool 214.

Figure 19:
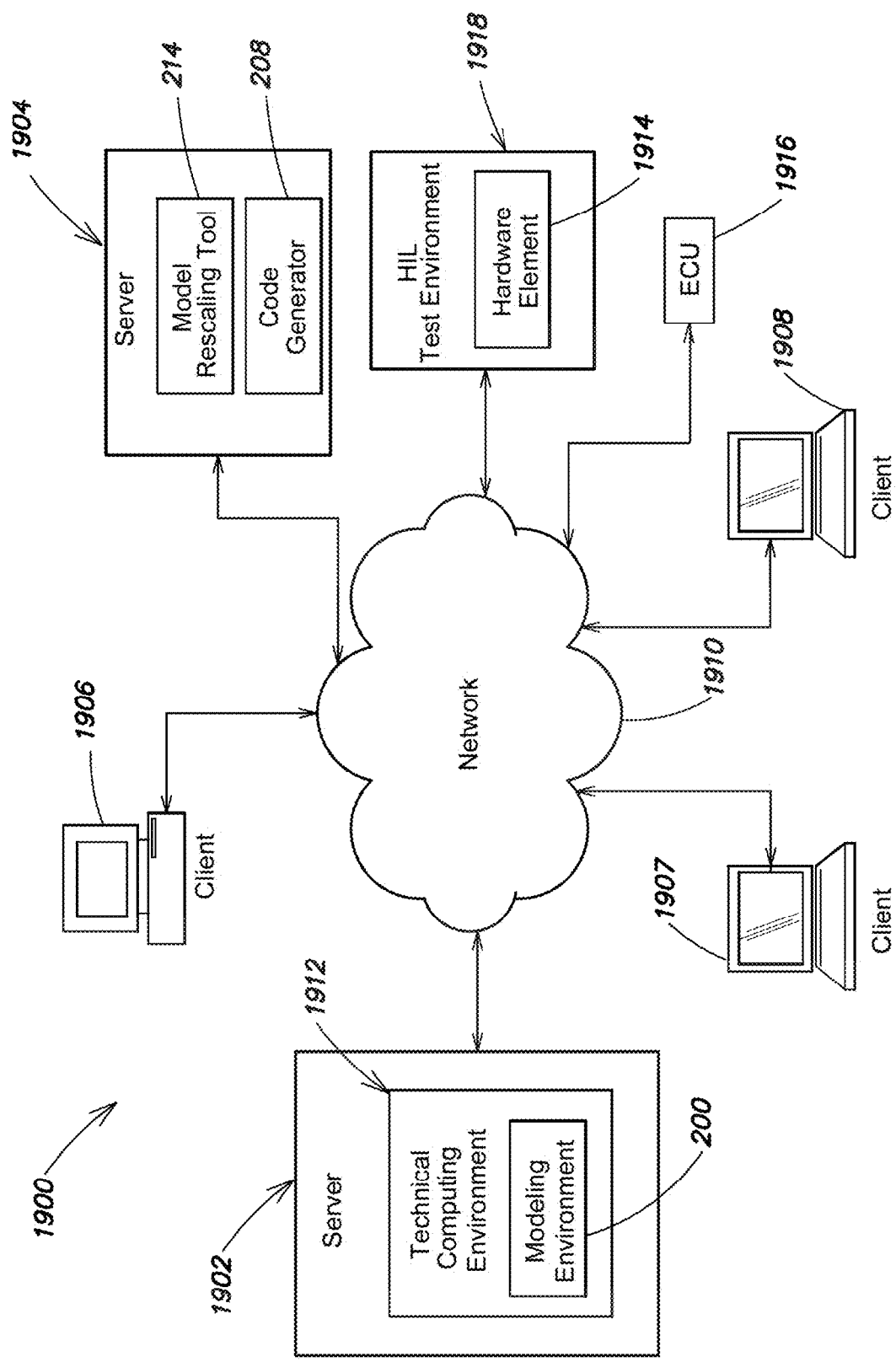
FIG. 19 is a schematic diagram of an example of a distributed computing environment in accordance with an embodiment.

FIG. 19 is a schematic diagram of a distributed computing environment 1900 in which systems and/or methods described herein may be implemented. The environment 1900 may include client and server devices, such as two servers 1902 and 1904, and three clients 1906-1908, interconnected by one or more networks, such as network 1910. The servers 1902 and 1904 may include applications or processes accessible by the clients 1906-1908. For example, the server 1902 may run a technical computing environment 1912 that may run the modeling environment 200. The server 1904 may run the model rescaling tool 214, the code generator 208, and/or some other application. The devices of the environment 1900 may interconnect via wired connections, wireless connections, or a combination of wired and wireless connections.

In some embodiments, the distributed environment 1900 may include a Hardware-in-the-Loop (HIL) test environment 1918, which may include one or more hardware elements indicated at 1914. The distributed environment 1900 also may include an electronic control unit (ECU) 1916.

The servers 1902 and 1904 may include one or more devices capable of receiving, generating, storing, processing, executing, and/or providing information. For example, the servers 1902 and 1904 may include a computing device, such as a server, a desktop computer, a laptop computer, a tablet computer, a handheld computer, or a similar device.

The clients 1906-1908 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1906-1908 may download data and/or code from the servers 1902 and 1904 via the network 1910. In some implementations, the clients 1906-1908 may be desktop computers, workstations, laptop computers, tablet computers, handheld computers, mobile phones (e.g., smart phones, radiotelephones, etc.), electronic readers, or similar devices. In some implementations, the clients 1906-1908 may receive information from and/or transmit information to the servers 1902 and 1904.

The network 1910 may include one or more wired and/or wireless networks. For example, the network 1910 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 19 is provided as an example. In practice, there may be additional devices and/or networks, fewer devices and/or networks, different devices and/or networks, or differently arranged devices and/or networks than those shown in FIG. 19. Furthermore, two or more devices shown in FIG. 19 may be implemented within a single device, or a single device shown in FIG. 19 may be implemented as multiple, distributed devices. Additionally, one or more of the devices of the distributed computing environment 1900 may perform one or more functions described as being performed by another one or more devices of the environment 1900.

The following examples implement one or more aspects of methods and/or systems of the present disclosure. These examples are non-limiting examples. Features of different examples may be combined in other implementations. Features of each example may be modified or removed in other implementations.

Aspect 1. A method comprising:

accessing an engine controller model and an engine model, the engine controller model and the engine model being executable, the engine controller model including original controller parameters and original controller lookup tables, the engine model including original engine parameters and original engine lookup tables, the engine model during execution simulating operation of an original engine of a given size;

receiving one or more rescaling factors that indicate a change in the given size of the original engine to a new size of a resized engine;

determining based on the one or more rescaling factors, a plurality of ratios between the original engine of the given size and the resized engine of the new size;

generating rescaled controller parameters by modifying the original controller parameters based on the plurality of ratios;

generating rescaled engine parameters by modifying the original engine parameters based on the plurality of ratios;

creating reshaped controller lookup tables by modifying the original controller lookup tables based on the plurality of ratios;

creating reshaped engine lookup tables by modifying the original engine lookup tables based on the plurality of ratios; and executing, by the processor, the engine controller model and the engine model utilizing the rescaled controller parameters, the rescaled engine parameters, the reshaped controller lookup tables, and the reshaped engine lookup tables, to simulate operation of the resized engine of the new size.

Aspect 2. The method of aspect 1 wherein the one or more rescaling factors include a maximum engine power and a number of engine cylinders.

Aspect 3. The method of any of the preceding aspects, in particular of aspect 1, wherein the plurality of ratios include at least one of:

a first ratio of engine speeds between the original engine of the given size and the resized engine of the new size;

a second ratio of engine torques between the original engine of the given size and the resized engine of the new size;

a third ratio of engine displacements between the original engine of the given size and the resized engine of the new size, or a fourth ratio of engine powers between the original engine of the given size and the resized engine of the new size.

Aspect 4. The method of any of the preceding aspects, in particular of aspect 3, wherein the original engine parameters include first engine parameters for engine volume characteristics, and the generating the rescaled engine parameters includes modifying the first parameters as a function of at least the second ratio.

Aspect 5. The method of any of the preceding aspects, in particular of aspect 3, wherein the original engine parameters include second engine parameters for engine area characteristics, and the generating the rescaled engine parameters includes modifying the second parameters as a function of at least the fourth ratio.

Aspect 6. The method of any of the preceding aspects, in particular of aspect 3, wherein one or more of the original engine lookup tables include first breakpoints for engine speed and second breakpoints for engine torque, injected fuel mass, or normalized cylinder air charge, and the creating reshaped engine lookup tables includes modifying the first breakpoints as a function of at least the first ratio, and modifying the second breakpoints as a function of at least the second ratio.

Aspect 7. The method of any of the preceding aspects, in particular of aspect 6, wherein the one or more of the original engine lookup tables further include table array data, the method further comprising:

modifying the table array data by at least one of the plurality of ratios.

Aspect 8. The method of any of the preceding aspects, in particular of aspect 1 wherein the executing includes:

generating, by the engine controller model, rescaled engine commands; and generating, by the engine model, rescaled engine output data.

Aspect 9. The method of any of the preceding aspects, in particular of aspect 1, wherein the original engine lookup tables include first tables containing emissions data for the original engine of the given size, the creating reshaped engine lookup tables includes reshaping the first tables to represent new emissions data for the resized engine of the new size.

Aspect 10. The method of any of the preceding aspects, in particular of aspect 1, wherein the executing the engine controller model and the engine model occurs over a range of test points producing rescaled engine output data, the method further comprising:

creating, by the processor, a set of static engine lookup tables from the rescaled engine output data; and creating a model element that includes the set of static engine lookup tables, where the model element represents a static engine equivalent to the engine model that utilizes the rescaled engine parameters and the reshaped engine lookup tables.

Aspect 11. The method of any of the preceding aspects, in particular of aspect 1, further comprising:

generating code for the engine controller model having the rescaled controller parameters and the reshaped controller lookup tables, the code configured for deployment as embedded software on an electronic control unit (ECU).

Aspect 12. The method of any of the preceding aspects, in particular of aspect 1, further comprising:

generating code for at least a portion of the engine model having the rescaled engine parameters and the reshaped engine lookup tables; and performing hardware-in-the-loop (HIL) testing of the engine controller model having the rescaled controller parameters and the reshaped controller lookup tables, using the code generated for the at least a portion of the engine model having the rescaled engine parameters and the reshaped engine lookup tables.

Aspect 13. The method of any of the preceding aspects, wherein:

an engine lookup table is adapted to store nonlinear engine behavior data; and/or a controller lookup table is adapted to store optimal control commands for given engine operating points.

Aspect 14. The method of any of the preceding aspects, wherein:

a lookup table relates controller command input values to controller output that will yield a desired response in the engine, in particular under quasi-steady and dynamic engine operating conditions; and/or a lookup table includes one or more input breakpoint datasets and output table data.

Aspect 15. The method of any of the preceding claims, wherein:

an input breakpoint data set is an index of input values for a particular dimension of the lookup table; and/or a breakpoint is defined as an input value included in an input breakpoint data set.

Aspect 16. The method of any of the preceding aspects, wherein parameters, in particular the number of cylinders and/or the displacement, of the engine model for a given engine architecture define the size of the engine.

Aspect 17. One or more non-transitory computer-readable media, having stored thereon instructions that when executed by a computing device, cause the computing device to implement a method according to any of the previous claims.

Aspect 18. An apparatus comprising:

a memory storing an engine controller model and an engine model, the engine controller model and the engine model being executable, the engine controller model including original controller parameters and original controller lookup tables, the engine model including original engine parameters and original engine lookup tables, the engine model during execution simulating operation of an original engine of a given size; and a processor coupled to the memory, the processor configured to:

receive one or more rescaling factors that indicate a change in the given size of the original engine to a new size of a resized engine;

determine, based on the one or more rescaling factors, a plurality of ratios between the original engine of the given size and the resized engine of the new size;

generate rescaled controller parameters by modifying the original controller parameters based on the plurality of ratios;

generate rescaled engine parameters by modifying the original engine parameters based on the plurality of ratios;

create reshaped controller lookup tables by modifying the original controller lookup tables based on the plurality of ratios;

create reshaped engine lookup tables by modifying the original engine lookup tables based on the plurality of ratios; and at least one of execute the engine controller model and the engine model utilizing the rescaled controller parameters, the rescaled engine parameters, the reshaped controller lookup tables, and the reshaped engine lookup tables, to simulate operation of the resized engine of the new size, or generate code for the engine controller model including the rescaled controller parameters and the reshaped controller lookup tables.

Aspect 19. The apparatus of aspect 18 wherein the plurality of ratios include at least one of:

a first ratio of engine speeds between the original engine of the given size and the resized engine of the new size;

a second ratio of engine torques between the original engine of the given size and the resized engine of the new size;

a third ratio of engine displacements between the original engine of the given size and the resized engine of the new size, or a fourth ratio of engine powers between the original engine of the given size and the resized engine of the new size.

Aspect 20. A method comprising:

accessing an engine controller model and an engine model, the engine controller model and the engine model being executable, the engine model during execution simulating operation of an original engine of a given size, the engine controller model including a model of the original engine and implementing a feedforward controller that matches the engine model;

receiving one or more rescaling factors that indicate a change in the given size of the original engine to a new size of a resized engine;

rescaling, based on the one or more rescaling factors, the engine model to simulate the resized engine of the new size;

rescaling, based on the one or more rescaling factors, the engine controller model to match the engine model as rescaled to simulate the resized engine of the new size; and executing the engine controller model and the engine model following the rescaling of the engine controller model and the rescaling of the engine model to simulate operation of the resized engine of the new size.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, generated code may be utilized advantageously with other embedded hardware, such as embedded hardware that includes floating point cores. Therefore, it is the object of the appended claims to cover all such variations and modifications as come within the true spirit and scope of the disclosure.

What is claimed is:

1. A method comprising:
   accessing, from a memory, an engine controller simulation model and an engine simulation model, the engine controller simulation model and the engine simulation model being executable by a simulation engine of a modeling environment, the engine controller simulation model including original controller parameters and original controller lookup tables, the engine simulation model including original engine parameters and original engine lookup tables, the engine simulation model during execution simulating operation of an original engine of a given size;
   receiving one or more rescaling factors that indicate a change in the given size of the original engine to a new size of a resized engine;
   determining, by a processor coupled to the memory, based on the one or more rescaling factors, a plurality of ratios between the original engine of the given size and the resized engine of the new size;
   generating, by the processor, rescaled controller parameters by modifying the original controller parameters based on the plurality of ratios;
   generating, by the processor, rescaled engine parameters by modifying the original engine parameters based on the plurality of ratios;
   creating, by the processor, reshaped controller lookup tables by modifying the original controller lookup tables based on the plurality of ratios; and
   creating, by the processor, reshaped engine lookup tables by modifying the original engine lookup tables based on the plurality of ratios.

2. The method of claim 1 wherein the one or more rescaling factors include a maximum engine power and a number of engine cylinders.

3. The method of claim 1 wherein the plurality of ratios include at least one of:
   a first ratio of engine speeds between the original engine of the given size and the resized engine of the new size;
   a second ratio of engine torques between the original engine of the given size and the resized engine of the new size;
   a third ratio of engine displacements between the original engine of the given size and the resized engine of the new size, or
   a fourth ratio of engine powers between the original engine of the given size and the resized engine of the new size.

4. The method of claim 3 wherein the original engine parameters include first engine parameters for engine volume characteristics, and the generating the rescaled engine parameters includes modifying the first engine parameters as a function of at least the second ratio.

5. The method of claim 3 wherein the original engine parameters include second engine parameters for engine area characteristics, and the generating the rescaled engine parameters includes modifying the second engine parameters as a function of at least the fourth ratio.

6. The method of claim 3 wherein one or more of the original engine lookup tables include first breakpoints for engine speed and second breakpoints for engine torque, injected fuel mass, or normalized cylinder air charge, and the creating the reshaped engine lookup tables includes modifying the first breakpoints as a function of at least the first ratio, and modifying the second breakpoints as a function of at least the second ratio.

7. The method of claim 6 wherein the one or more of the original engine lookup tables further include table array data, the method further comprising:
   modifying the table array data by at least one of the plurality of ratios.

8. The method of claim 1 wherein the original engine lookup tables include first tables containing emissions data for the original engine of the given size, the creating the reshaped engine lookup tables includes reshaping the first tables to represent new emissions data for the resized engine of the new size.

9. The method of claim 1 further comprising:
   generating code for the engine controller simulation model having the rescaled controller parameters and the reshaped controller lookup tables, the code configured for deployment as embedded software on an electronic control unit (ECU).

10. The method of claim 1 further comprising:
    generating code for at least a portion of the engine simulation model having the rescaled engine parameters and the reshaped engine lookup tables; and
    performing hardware-in-the-loop (HIL) testing of the engine controller simulation model having the rescaled controller parameters and the reshaped controller lookup tables, using the code generated for the at least a portion of the engine simulation model having the rescaled engine parameters and the reshaped engine lookup tables.

11. The method of claim 1 further comprising:
    executing, by the processor, the engine controller simulation model and the engine simulation model utilizing the rescaled controller parameters, the rescaled engine parameters, the reshaped controller lookup tables, and the reshaped engine lookup tables, to simulate operation of the resized engine of the new size.

12. The method of claim 11 wherein the executing includes:
    generating, by the engine controller simulation model, rescaled engine commands; and
    generating, by the engine simulation model, rescaled engine output data.

13. The method of claim 11 wherein the executing the engine controller simulation model and the engine simulation model occurs over a range of test points producing rescaled engine output data, the method further comprising:
    creating, by the processor, a set of static engine lookup tables from the rescaled engine output data; and
    creating a model element that includes the set of static engine lookup tables, where the model element represents a static engine equivalent to the engine simulation model that utilizes the rescaled engine parameters and the reshaped engine lookup tables.

14. The method of claim 1 wherein one or more of the steps are performed within at least one of the modeling environment or a rescaling tool.

15. The method of claim 1 wherein the simulation engine of the modeling environment includes one or more of an interpreter, a parser, a model compiler, or a solver.

16. One or more non-transitory computer-readable media, having stored thereon instructions that when executed by a computing device, cause the computing device to perform operations comprising:

access, from a memory, an engine controller simulation model and an engine simulation model, the engine controller simulation model and the engine simulation model being executable by a simulation engine of a modeling environment, the engine controller simulation model including original controller parameters and original controller lookup tables, the engine simulation model including original engine parameters and original engine lookup tables, the engine simulation model during execution simulating operation of an original engine of a given size;

receive one or more rescaling factors that indicate a change in the given size of the original engine to a new size of a resized engine;

determine, by a processor coupled to the memory, based on the one or more rescaling factors, a plurality of ratios between the original engine of the given size and the resized engine of the new size;

generate, by the processor, rescaled controller parameters by modifying the original controller parameters based on the plurality of ratios;

generate, by the processor, rescaled engine parameters by modifying the original engine parameters based on the plurality of ratios;

create, by the processor, reshaped controller lookup tables by modifying the original controller lookup tables based on the plurality of ratios;

create, by the processor, reshaped engine lookup tables by modifying the original engine lookup tables based on the plurality of ratios; and at least one of
  execute the engine controller simulation model and the engine simulation model utilizing the rescaled controller parameters, the rescaled engine parameters, the reshaped controller lookup tables, and the reshaped engine lookup tables, to simulate operation of the resized engine of the new size, or
  generate code for the engine controller simulation model including the rescaled controller parameters and the reshaped controller lookup tables.

17. The one or more non-transitory computer-readable media of claim 16 wherein the plurality of ratios include at least one of:
  a first ratio of engine speeds between the original engine of the given size and the resized engine of the new size;
  a second ratio of engine torques between the original engine of the given size and the resized engine of the new size;
  a third ratio of engine displacements between the original engine of the given size and the resized engine of the new size, or
  a fourth ratio of engine powers between the original engine of the given size and the resized engine of the new size.

18. The one or more non-transitory computer readable media of claim 17 wherein
  the original engine parameters include first engine parameters for engine volume characteristics, and the generating the rescaled engine parameters includes modifying the first engine parameters as a function of at least the second ratio, and
  the original engine parameters include second engine parameters for engine area characteristics, and the generating the rescaled engine parameters includes modifying the second engine parameters as a function of at least the fourth ratio.

19. The one or more non-transitory computer-readable media of claim 17 wherein one or more of the original engine lookup tables include first breakpoints for engine speed and second breakpoints for engine torque, injected fuel mass, or normalized cylinder air charge, and the creating the reshaped engine lookup tables includes modifying the first breakpoints as a function of at least the first ratio, and modifying the second breakpoints as a function of at least the second ratio.

20. The one or more non-transitory computer-readable media of claim 16 wherein the original engine lookup tables include first tables containing emissions data for the original engine of the given size, the creating the reshaped engine lookup tables includes reshaping the first tables to represent new emissions data for the resized engine of the new size.

21. The one or more non-transitory computer-readable media of claim 16 wherein the
  code generated for the engine controller simulation model including the rescaled controller parameters and the reshaped controller lookup tables is configured for deployment as embedded software on an electronic control unit (ECU).

22. The one or more non-transitory computer-readable media of claim 16 wherein the operations further comprise:
  generate code for at least a portion of the engine simulation model having the rescaled engine parameters and the reshaped engine lookup tables; and
  perform hardware-in-the-loop (HIL) testing of the engine controller simulation model having the rescaled controller parameters and the reshaped controller lookup tables, using the code generated for the at least a portion of the engine simulation model having the rescaled engine parameters and the reshaped engine lookup tables.

23. An apparatus comprising:
  a memory storing an engine controller simulation model and an engine simulation model, the engine controller simulation model and the engine simulation model being executable by a simulation engine of a modeling environment, the engine controller simulation model including original controller parameters and original controller lookup tables, the engine simulation model including original engine parameters and original engine lookup tables, the engine simulation model during execution simulating operation of an original engine of a given size; and
  a processor coupled to the memory, the processor configured to:
    receive one or more rescaling factors that indicate a change in the given size of the original engine to a new size of a resized engine;
    determine, based on the one or more rescaling factors, a plurality of ratios between the original engine of the given size and the resized engine of the new size;
    generate rescaled controller parameters by modifying the original controller parameters based on the plurality of ratios;
    generate rescaled engine parameters by modifying the original engine parameters based on the plurality of ratios;
    create reshaped controller lookup tables by modifying the original controller lookup tables based on the plurality of ratios;
    create reshaped engine lookup tables by modifying the original engine lookup tables based on the plurality of ratios; and
    at least one of execute the engine controller simulation model and the engine simulation model utilizing the rescaled controller parameters, the rescaled engine parameters, the reshaped controller lookup tables, and the reshaped engine lookup tables, to simulate operation of the resized engine of the new size, or generate code for the engine controller simulation model including the rescaled controller parameters and the reshaped controller lookup tables.

24. The apparatus of claim 23 wherein the plurality of ratios include at least one of:
a first ratio of engine speeds between the original engine of the given size and the resized engine of the new size;
a second ratio of engine torques between the original engine of the given size and the resized engine of the new size;
a third ratio of engine displacements between the original engine of the given size and the resized engine of the new size, or
a fourth ratio of engine powers between the original engine of the given size and the resized engine of the new size.

25. The apparatus of claim 23 wherein the
code generated for the engine controller simulation model including the rescaled controller parameters and the reshaped controller lookup tables is configured for deployment as embedded software on an electronic control unit (ECU).

26. The apparatus of claim 23 wherein the processor is further configured to:
generate code for at least a portion of the engine simulation model having the rescaled engine parameters and the reshaped engine lookup tables; and
perform hardware-in-the-loop (HIL) testing of the engine controller simulation model having the rescaled controller parameters and the reshaped controller lookup tables, using the code generated for the at least a portion of the engine simulation model having the rescaled engine parameters and the reshaped engine lookup tables.

27. A method comprising:
accessing, from a memory, within a modeling environment, an engine controller simulation model and an engine simulation model, the engine controller simulation model and the engine simulation model being executable by a simulation engine of a modeling environment, the engine simulation model during execution simulating operation of an original engine of a given size, the engine controller simulation model including a model of the original engine and implementing a feedforward controller that matches the engine simulation model;
receiving one or more rescaling factors that indicate a change in the given size of the original engine to a new size of a resized engine;
rescaling, by a processor coupled to the memory, based on the one or more rescaling factors, the engine simulation model to simulate the resized engine of the new size;
rescaling, by the processor, based on the one or more rescaling factors, the engine controller simulation model to match the engine simulation model as rescaled to simulate the resized engine of the new size; and
executing, by the processor, the engine controller simulation model and the engine simulation model following the rescaling of the engine controller simulation model and the rescaling of the engine simulation model to simulate operation of the resized engine of the new size.

28. The method of claim 27 further comprising:
determining, by the processor, a plurality of ratios, based on the one or more rescaling factors, between the original engine of the given size and the resized engine of the new size;
utilizing one or more of the plurality of ratios in the rescaling the engine simulation model and the rescaling the engine controller simulation model, wherein the plurality of ratios includes at least one of:
a first ratio of engine speeds between the original engine of the given size and the resized engine of the new size;
a second ratio of engine torques between the original engine of the given size and the resized engine of the new size;
a third ratio of engine displacements between the original engine of the given size and the resized engine of the new size, or
a fourth ratio of engine powers between the original engine of the given size and the resized engine of the new size.

29. The method of claim 28 wherein the rescaling the engine simulation model includes
generating first rescaled engine parameters for engine volume characteristics as a function of at least the second ratio and
generating second rescaled engine parameters for engine area characteristics as a function of at least the fourth ratio.

30. The method of claim 28 wherein the rescaling the engine simulation model includes modifying original engine lookup tables of the engine simulation model.

31. The method of claim 27 further comprising:
generating code for the engine controller simulation model following the rescaling the engine controller simulation model, the code configured for deployment as embedded software on an electronic control unit (ECU).

32. One or more non-transitory computer-readable media, having stored thereon instructions that when executed by a computing device, cause the computing device to perform operations comprising:
access, from a memory, within a modeling environment, an engine controller simulation model and an engine simulation model, the engine controller simulation model and the engine simulation model being executable by a simulation engine of a modeling environment, the engine simulation model during execution simulating operation of an original engine of a given size, the engine controller simulation model including a model of the original engine and implementing a feedforward controller that matches the engine simulation model;
receive one or more rescaling factors that indicate a change in the given size of the original engine to a new size of a resized engine;
rescale, by one or more processors coupled to the memory, based on the one or more rescaling factors, the engine simulation model to simulate the resized engine of the new size;
rescale, by the one or more processors, based on the one or more rescaling factors, the engine controller simulation model to match the engine simulation model as rescaled to simulate the resized engine of the new size; and execute, by the one or more processors, the engine controller simulation model and the engine simulation model following the rescaling of the engine simulation controller model and the rescaling of the engine simulation model to simulate operation of the resized engine of the new size.

33. The one or more non-transitory computer-readable media of claim 32 wherein the operations further comprise:
   determine, by the processor, a plurality of ratios, based on the one or more rescaling factors, between the original engine of the given size and the resized engine of the new size;
   utilize one or more of the plurality of ratios in the rescaling the engine simulation model and in the rescaling the engine controller simulation model, wherein the plurality of ratios includes at least one of:
   a first ratio of engine speeds between the original engine of the given size and the resized engine of the new size;
   a second ratio of engine torques between the original engine of the given size and the resized engine of the new size;
   a third ratio of engine displacements between the original engine of the given size and the resized engine of the new size, or
   a fourth ratio of engine powers between the original engine of the given size and the resized engine of the new size.

34. The one or more non-transitory computer-readable media of claim 32 wherein the rescaling the engine simulation model includes
   generating first rescaled engine parameters for engine volume characteristics as a function of at least the second ratio and
   generating second rescaled engine parameters for engine area characteristics as a function of at least the fourth ratio.

35. The one or more non-transitory computer-readable media of claim 32 wherein the rescaling the engine simulation model includes modifying original engine lookup tables of the engine simulation model.

36. The one or more non-transitory computer-readable media of claim 32 wherein the operations further comprise:
   generate code for the engine controller simulation model following the rescaling the engine controller simulation model, the code configured for deployment as embedded software on an electronic control unit (ECU).

* * * * *